US010873694B2

(12) United States Patent
Nakamura

(10) Patent No.: US 10,873,694 B2
(45) Date of Patent: Dec. 22, 2020

(54) IMAGING APPARATUS, CONTROL APPARATUS, AND STORAGE MEDIUM PROVIDING PHASE DIFFERENCE DETECTION FOCUSING CONTROL OF AN IMAGE HAVING A SATURATED OBJECT

(71) Applicant: CANON KABUSHIKI KAISHA, Tokyo (JP)

(72) Inventor: Shun Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 16/211,261

(22) Filed: Dec. 6, 2018

(65) Prior Publication Data

US 2019/0191100 A1 Jun. 20, 2019

(30) Foreign Application Priority Data

Dec. 18, 2017 (JP) .................................. 2017-242226

(51) Int. Cl.
*H04N 5/232* (2006.01)
(52) U.S. Cl.
CPC . *H04N 5/232122* (2018.08); *H04N 5/232127* (2018.08)
(58) Field of Classification Search
CPC ................... H04N 5/232122; H04N 5/232127
See application file for complete search history.

(56) References Cited

U.S. PATENT DOCUMENTS

| 9,106,827 B2* | 8/2015 | Fukuda | H01L 27/14643 |
|---|---|---|---|
| 9,313,469 B2* | 4/2016 | Kanda | H04N 9/045 |
| 10,484,592 B2* | 11/2019 | Hoshino | H04N 5/232122 |
| 2014/0307134 A1* | 10/2014 | Kanda | H04N 9/07 348/280 |
| 2014/0320711 A1* | 10/2014 | Fukuda | H04N 5/3696 348/294 |
| 2018/0152619 A1* | 5/2018 | Hoshino | H04N 5/23293 |

FOREIGN PATENT DOCUMENTS

JP  2015-018194 A  1/2015

* cited by examiner

*Primary Examiner* — Gary C Vieaux
(74) *Attorney, Agent, or Firm* — Venable LLP

(57) ABSTRACT

An imaging apparatus includes an image sensor configured to output a pair of image signals based on a pair of light fluxes that have passed different exit pupil regions in an imaging optical system that includes a focus lens, a calculator configured to calculate a plurality of focus evaluation values each having a different setting condition, based on the pair of image signals in a focus detection area in an image captured by the image sensor, a detector configured to detect a plurality of saturation degrees for each of the plurality of focus evaluation values, and a focusing unit configured to drive the focus lens by using focus evaluation values for focusing selected based on the plurality of saturation degrees out of the plurality of focus evaluation values. The detector changes a parameter used to detect the plurality of saturation degrees based on the setting condition.

13 Claims, 24 Drawing Sheets

NON-IMAGING PLANE PHASE DIFFERENCE METHOD PIXEL CONFIGURATION

| R | Gr | R | Gr | R | Gr | R | Gr |
|---|----|---|----|---|----|---|----|
| Gb | B | Gb | B | Gb | B | Gb | B |

FIG. 2A

IMAGING PLANE PHASE DIFFERENCE METHOD PIXEL CONFIGURATION

| R B | Gr B | R B | Gr B | R B | Gr B | R B | Gr B |
|-----|------|-----|------|-----|------|-----|------|
| R A | Gr A | R A | Gr A | R A | Gr A | R A | Gr A |
| Gb B | B B | Gb B | B B | Gb B | B B | Gb B | B B |
| Gb A | B A | Gb A | B A | Gb A | B A | Gb A | B A |

FIG. 2B

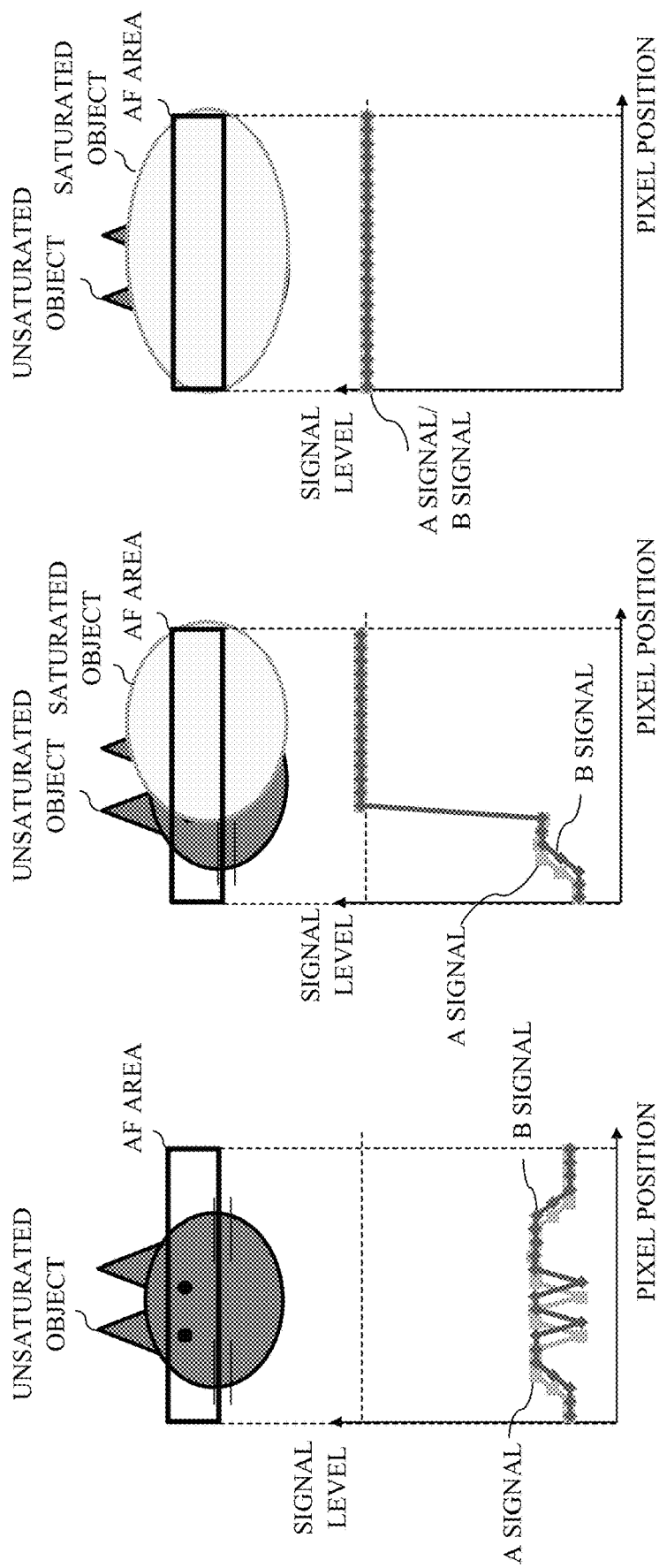

IMAGING APPARATUS, CONTROL APPARATUS, AND STORAGE MEDIUM PROVIDING PHASE DIFFERENCE DETECTION FOCUSING CONTROL OF AN IMAGE HAVING A SATURATED OBJECT

BACKGROUND OF THE INVENTION

Field of the Invention

The present invention relates to an imaging apparatus (image capturing apparatus) and a storage medium for providing focusing based on the phase difference detection method.

Description of the Related Art

The AF (autofocus) has difficulties in properly working for a saturated object that saturates a pixel due to the brightness. In autofocusing the saturated object through the image plane phase difference detection method, it is difficult to detect a phase difference between image signals at saturated parts. Therefore, the AF accuracy may lower or the phase difference cannot be detected at all.

Japanese Patent Laid-Open No. ("JP") 2015-18194 discloses a focus detection apparatus that detects, when a phase difference detecting area contains a saturated pixel, a phase difference for each area that contains the saturated pixel and for each area that does not contain a saturated pixel. When determining that the AF accuracy of the phase difference detected in the area that does not contain the saturated pixel is reliable, the focus detection apparatus disclosed in JP 2015-18194 uses this phase difference for the AF.

Nevertheless, the focus detection apparatus disclosed in JP 2015-18194 needs enormous processing and a complicated detection circuit configuration in order to detect the area that does not contain the saturated pixel and to detect the phase difference in that area.

When the saturated pixel has a small influence, a sufficiently accurate AF is available by detecting a phase difference of an edge portion between the saturated pixel and an unsaturated pixel. However, the focus detection apparatus disclosed in JP 2015-18194 excludes the saturated pixel, cannot use the edge portions between the saturated pixel and the unsaturated pixel, and may lower the AF accuracy.

SUMMARY OF THE INVENTION

The present invention provides an imaging apparatus and a storage medium which can provide proper focusing in capturing an image of a saturated object in an AF control using an image plane phase difference detection method.

An imaging apparatus according to one aspect of the present invention includes an image sensor configured to output a pair of image signals based on a pair of light fluxes that have passed different exit pupil regions in an imaging optical system that includes a focus lens, a calculator configured to calculate a plurality of focus evaluation values each having a different setting condition, based on the pair of image signals in a focus detection area in an image captured by the image sensor, a detector configured to detect a plurality of saturation degrees for each of the plurality of focus evaluation values, and a focusing unit configured to drive the focus lens by using focus evaluation values for focusing selected based on the plurality of saturation degrees out of the plurality of focus evaluation values. The detector changes a parameter used to detect the plurality of saturation degrees based on the setting condition.

A control apparatus according to another aspect of the present invention includes a calculation unit configured to calculate a plurality of focus evaluation values each having a different setting condition, based on a pair of image signals in a focus detection area in an image captured by an image sensor configured to output the pair of image signals based on a pair of light fluxes that have passed different exit pupil regions in an imaging optical system that includes a focus lens, a detection unit configured to detect a plurality of saturation degrees for each of the plurality of focus evaluation values, and a focusing unit configured to drive the focus lens by using focus evaluation values for focusing selected based on the plurality of saturation degrees out of the plurality of focus evaluation values. The detection unit changes a parameter used to detect the plurality of saturation degrees based on the setting condition. At least one processor or circuit is configured to perform a function of at least one of the units.

A computer-readable non-transitory storage medium according to another aspect of the present invention for storing a computer program that enables a computer to execute a method includes a calculating step of calculating a plurality of focus evaluation values each having a different setting condition, based on the pair of image signals in a focus detection area in an image captured by an image sensor configured to output the pair of image signals based on a pair of light fluxes that have passed different exit pupil regions in an imaging optical system that includes a focus lens, a detecting step of detecting a plurality of saturation degrees for each of the plurality of focus evaluation values, and a focusing step of driving the focus lens by using focus evaluation values for focusing selected based on the plurality of saturation degrees out of the plurality of focus evaluation values. The detecting step changes a parameter used to detect the plurality of saturation degrees based on the setting condition.

Further features of the present invention will become apparent from the following description of exemplary embodiments with reference to the attached drawings.

BRIEF DESCRIPTION OF THE DRAWINGS

FIGS. 2A and 2B illustrate a pixel configuration incompatible with the image plane phase difference AF and a pixel configuration compatible with the image plane phase difference AF.

FIGS. 3A and 3C illustrate illustrative A and B signals depending on a relationship between an unsaturated object and a saturated object in an AF area.

DESCRIPTION OF THE EMBODIMENTS

Figure 1:
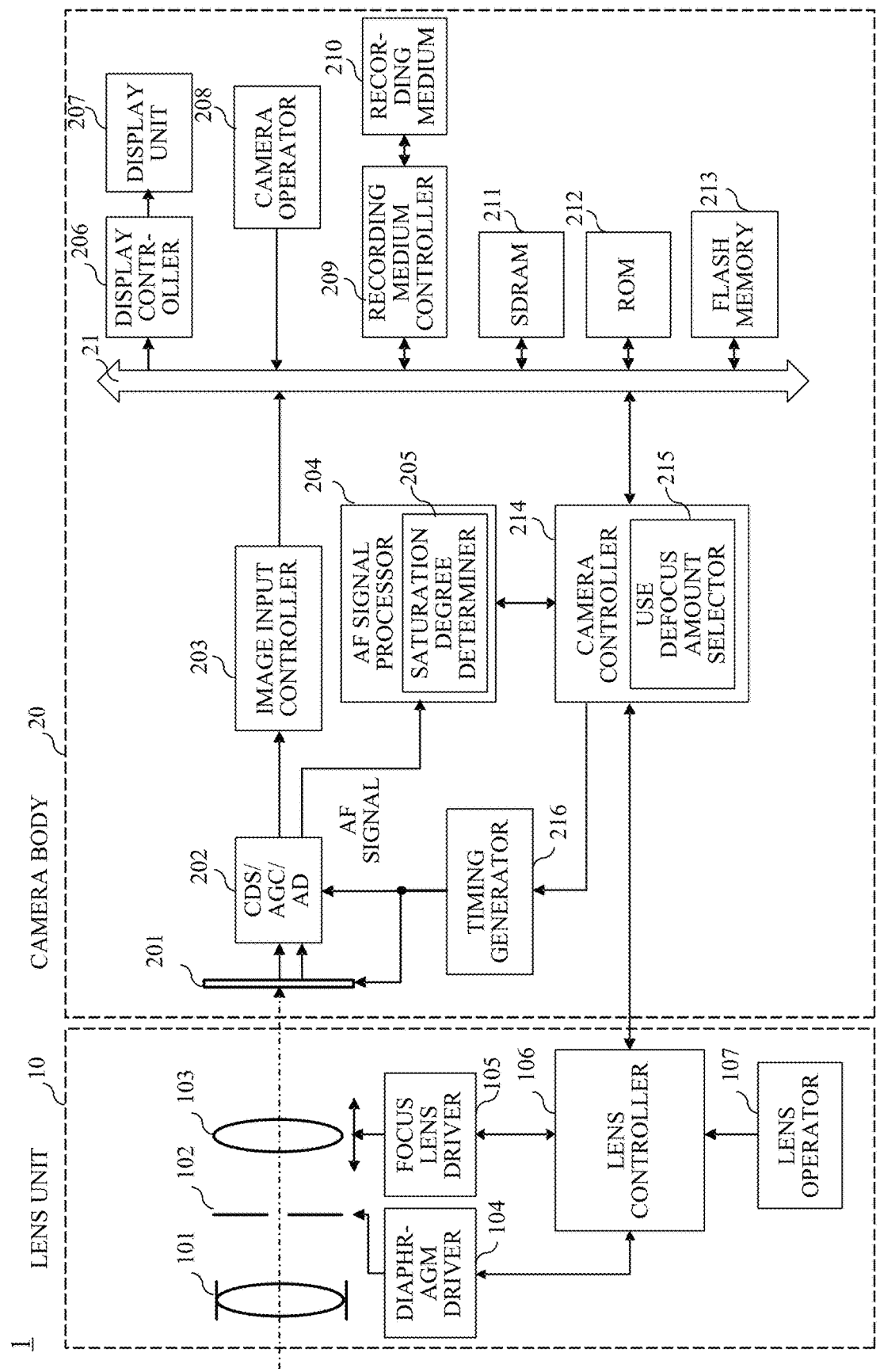
FIG. 1 is a block diagram of a camera system according to first to fourth embodiments.

Referring now to the accompanying drawings, a detailed description will be given of embodiments according to the present invention. In each figure, corresponding elements will be designated by the same reference numerals, and a duplicate description thereof will be omitted.

First Embodiment

FIG. 1 is a block diagram of a camera system 1 according to this embodiment. The camera system 1 has a lens unit 10 and a camera body (imaging apparatus) 20. The lens unit 10 is detachably attached to the camera body 20. The lens unit 10 has a lens controller 106 that integrally controls the overall lens operation. The camera body 20 has a camera controller (focusing unit) 214 that controls the overall operation of the camera system 1. The lens controller 106 and the camera controller 214 can communicate with each other through terminals provided on the lens mount. This embodiment detachably attaches the lens unit 10 to the camera body 20, but the present invention is not limited to this embodiment. The lens unit 10 may be provided in the camera body 20.

A description will now be given of the configuration of the lens unit 10. The lens unit 10 has a fixed lens 101, a diaphragm (or stop) 102, a focus lens 103, a diaphragm driver 104, a focus lens driver 105, a lens controller 106, and a lens operator 107. The fixed lens 101, the diaphragm 102, and the focus lens 103 constitute an imaging optical system. The diaphragm 102 is driven by the diaphragm driver 104 and controls a light quantity entering the image sensor 201. The focus lens 103 is driven by the focus lens driver 105. A focal length of the imaging optical system changes according to the position of the focus lens 103. The lens controller 106 controls the diaphragm driver 104 and the focus lens driver 105 according to a control command and control information received from the camera controller 214 and transmits lens control information to the camera controller 214. The diaphragm driver 104 is controlled by the lens controller 106, and determines an aperture amount in the diaphragm 102. The focus lens driver 105 is controlled by the lens controller 106 and determines the position of the focus lens 103. The lens operator 107 is an input unit for the user to make settings relating to the operation (or manipulation) of the lens unit 10, such as positioning of the focus lens 103 by MF (manual focus). When the lens operator 107 is operated, the lens controller 106 performs a control in accordance with the operation.

A description will now be given of the camera body 20. The image sensor 201 includes a CCD or a CMOS sensor. A light flux that has passed the imaging optical system in the lens unit 10 forms an image on the light receiving surface on the image sensor 201 and is converted into a signal charge corresponding to an incident light amount by a photodiode provided in a pixel arranged in the image sensor 201. A signal charge accumulated in each photodiode is sequentially read out of the image sensor 201 as a voltage signal corresponding to the signal charge in synchronization with a driving pulse output from a timing generator 216 in accordance with the command from the camera controller 214.

Each pixel in the image sensor 201 includes a pair of (two) photodiodes A and B and one micro lens provided for the pair of photodiodes A and B. A pair of light fluxes that have passed through different exit pupil regions in the imaging optical system enter the pair of photodiodes A and B through the micro lenses. A pair of optical images are formed on the pair of photodiodes A and B, and the pair of photodiodes A and B generates a pair of pixel signals (A signal and B signal) used for an AF signal as described later. An image signal (A+B signals) can be obtained by adding the outputs from the pair of photodiodes A and B to each other. A pair of image signals as the AF signals (or focus detection signals) used for the AF based on the image plane phase difference detection method (referred to as an "image plane phase difference AF" hereinafter) can be obtained by combining a plurality of A signals and a plurality of B signals output from a plurality of pixels with each other.

An AF signal processor (calculator or calculation unit) 204 calculates a correlation between the pair of image signals, then a phase difference (referred to as an "image shift amount" hereinafter) as a shift amount between the pair of image signals, and then a defocus amount (and a defocus direction) of the imaging optical system based on the image shift amount.

FIG. 2A illuminates a (noncompatible) pixel configuration incompatible with the image plane phase difference AF, and FIG. 2B illustrates a pixel configuration compatible with the image plane phase difference AF. Each figure uses the Bayer array, where R stands for a red color filter, B stands for a blue color filter, and Gr and Gb stand for green color filters. In the pixel configuration in FIG. 2B, two photodiodes A and B divided into two in the horizontal direction in the figure are provided in a pixel corresponding to one pixel in the pixel configuration illustrated in FIG. 2A. The pixel dividing method illustrated in FIG. 2B is merely illustrative, and may divide the pixel in the vertical direction in the figure. Plural types of pixels divided by different dividing methods may be included in the same image sensor.

A CDS/AGC/AD converter 202 performs correlated double sampling for removing a reset noise, a gain control, and an AD conversion for the AF signal and the image capturing signal read from the image sensor 201. The image capturing signal and the AF signal for which the processing has been executed are output to an image input controller 203 and an AF signal processor 204, respectively.

The image input controller 203 stores the image capturing signal output from the CDS/AGC/AD converter 202 as an image signal in an SDRAM 211 via a bus 21. The image signal stored in the SDRAM 211 is read by a display controller 206 via the bus 21 and displayed on a display unit 207. In a mode of recording the image signal, the image signal stored in the SDRAM 211 is recorded in the recording medium 210, such as a semiconductor memory, by a recording medium controller 209.

A ROM 212 stores a control program and a processing program executed by the camera controller 214, various data necessary for executing them, and the like. A flash ROM 213 stores various setting information and the like regarding the operation of the camera body 20 set by the user.

The camera controller 214 includes a microcomputer, executes the computer program stored in the ROM 212, and exchanges information with each component in the camera body 20 and the lens controller 106 so as to control these components. Based on the image shift amount and reliability calculated by an AF signal processor 204 and information indicating the states of the lens unit 10 and the camera body 20, the camera controller 214 changes settings of the AF signal processor 204, if necessary. For example, when an image shift amount is equal to or greater than a predetermined amount, a correlation calculation region is widely set, or a type of the bandpass filter is changed according to the contrasts of the pair of image signals. In addition, parameters for the correlation calculation and the number of correlation calculations are changed according to the AF mode set by the user. Furthermore, the camera controller 214 transmits a control command to the lens unit 10 (lens controller 106) and information of the camera body 20 to the lens controller 106, and acquires information of the lens unit 10 from the lens controller 106.

The camera controller 214 has a use defocus amount selector 215. As will be described later, the use defocus amount selector 215 selects a defocus amount for actually controlling driving of the focus lens 103 based on the plurality of defocus amounts calculated by the AF signal processor 204 through the lens controller 106. For example, a description will be given of the AF signal processor 204 that calculates a plurality of image shift amounts by changing the band of the bandpass filter to be multiplied by the A signal and the B signal. A higher band of the bandpass filter can improve the AF accuracy near the in-focus on the object, but the calculation ability of the image shift amount lowers in a defocus state. On the other hand, a lower band of the bandpass filter lowers the AF accuracy, but the calculation ability of the image shift amount improves in the defocus state. The use defocus amount selector 215 selects a defocus amount suitable for the situation from among a plurality of defocus amounts based on a plurality of different image shift amounts calculated by the AF signal processor 204, providing a more suitable AF control.

The AF signal processor 204 includes a saturation degree determiner 205. The saturation degree determiner 205 detects a plurality of saturation degrees for each of a plurality of image shift amounts calculated by the AF signal processor 204. The use defocus amount selector 215 selects the defocus amount for focusing based on the saturation degree detected by the saturation degree determiner 205.

When the A signal and the B signal are saturated where a high luminance object is captured or the like, the AF signal processor 204 may not be able to appropriately calculate an image shift amount. FIGS. 3A to 3C illustrate illustrative A and B signals depending a relationship between an unsaturated object (main object) and a saturated object in an AF area (focus detection area). In FIG. 3A, only the signal of the unsaturated object can be detected as the A signal and B signal, and the image shift amount of the unsaturated object can be properly detected. In FIG. 3B, the saturated object covers most of the unsaturated objects, and only part of the A signal and the B signal of the unsaturated object can be detected. Hence, depending on the contrast degree of the unsaturated object, the calculation accuracy of the image shift amount may be lower than that in FIG. 3A. In FIG. 3C, the saturated object completely covers and hides the unsaturated object, and both the A signal and the B signal are saturated. Therefore, the image shift amount of the unsaturated object cannot be calculated and the AF is unavailable. Where it is determined that the sufficient AF accuracy cannot be obtained due to a large influence of the saturation, the camera controller 214 needs to perform the control where the AF is unavailable.

The image shift amount can be caused by a calculation with a different visual field range for the correlation calculation, by the different pixel addition number in the horizontal direction (horizontal pixel addition number) between the A signal and the B signal before the correlation calculation to change the band, by the different tap number in the bandpass filter, etc. When these parameters are different, there are a more influenced image shift amount and a less influenced image shift amount depending on the saturated pixel relationship between the A signal and the B signal.

Figure 4A:
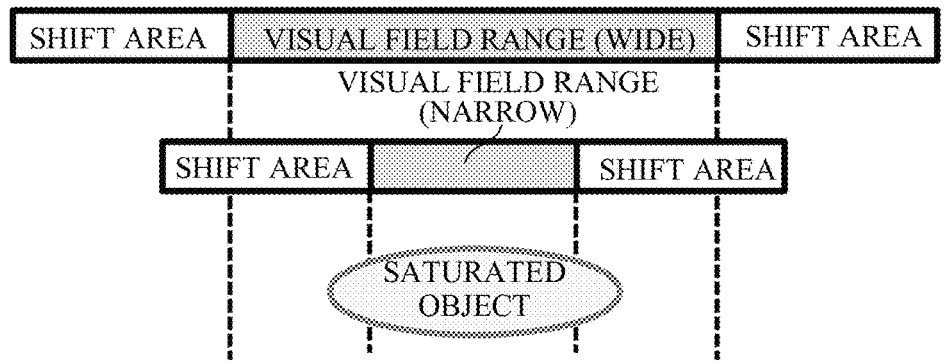
FIGS. 4A to 4C illustrate patterns of a relationship among a visual field range, a horizontally added pixel or a filter pixel area used in the visual field range, and a saturated object.
Figure 4B:
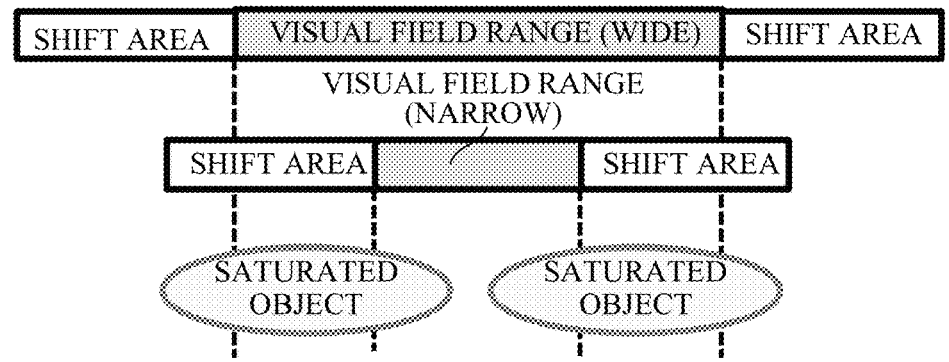
Figure 4C:
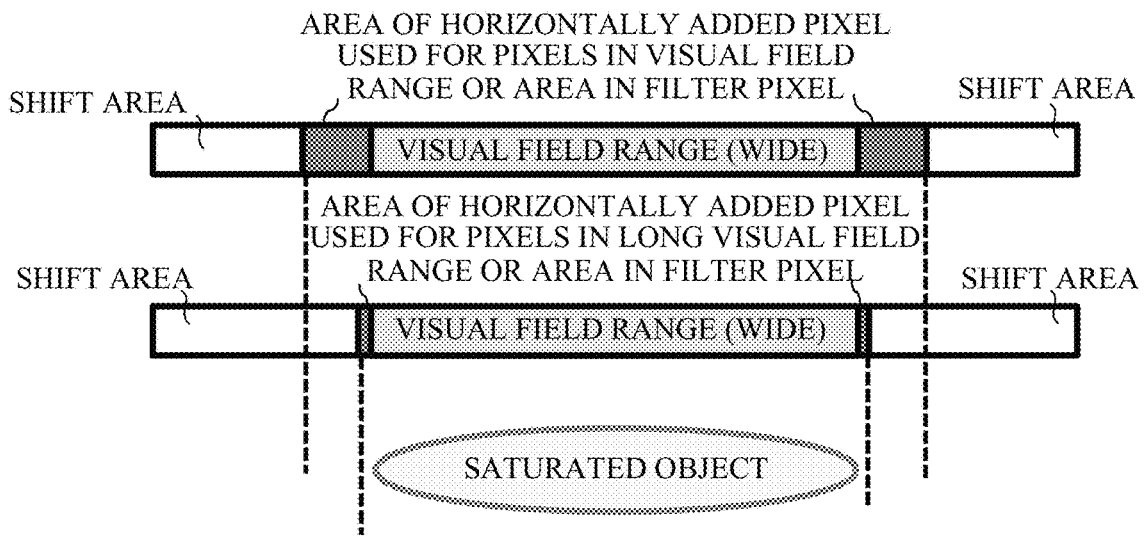

FIGS. 4A to 4C illustrate patterns of a relationship among a visual field range, a horizontally added pixel or a filter pixel area used in the visual field range, and a saturated object. FIG. 4A compares visual field ranges different from each other. For a narrow visual field range, the saturated object is completely contained in the visual field and it is thus difficult to calculate the image shift amount through the correlation calculation, whereas for a wide visual field range, the image shift amount can be calculated with an unsaturated object. FIG. 4B compares visual field ranges different from each other, and is different from FIG. 4A in the relationship with the saturated object. Whether the visual field range is wide or narrow, the saturated object is related but the narrow visual field range has a small ratio of the saturated object. FIG. 4C illustrates the same visual field range but the horizontal pixel addition number or the tap number in the bandpass filter is different. In FIG. 4C, the horizontal pixel addition number or the tap number in the bandpass filter is larger in the upper part. The ratio of the saturated object is relatively smaller as the horizontal pixel addition number or the tap number in the bandpass filter is larger. Thus, even when a saturated object is captured, there is an image shift amount that can be determined to have a small influence of the saturation degree based on the saturation degree detected by the saturation degree determiner 205 among the plurality of image shift amounts calculated by the AF signal processor 204. Then, the defocus amount selector 215 selects a defocus amount calculated based on the image shift amount with a small saturation degree or comparatively good AF accuracy, performs the AF control, and thereby the AF can work even in capturing an image of the saturated object.

Figure 5:
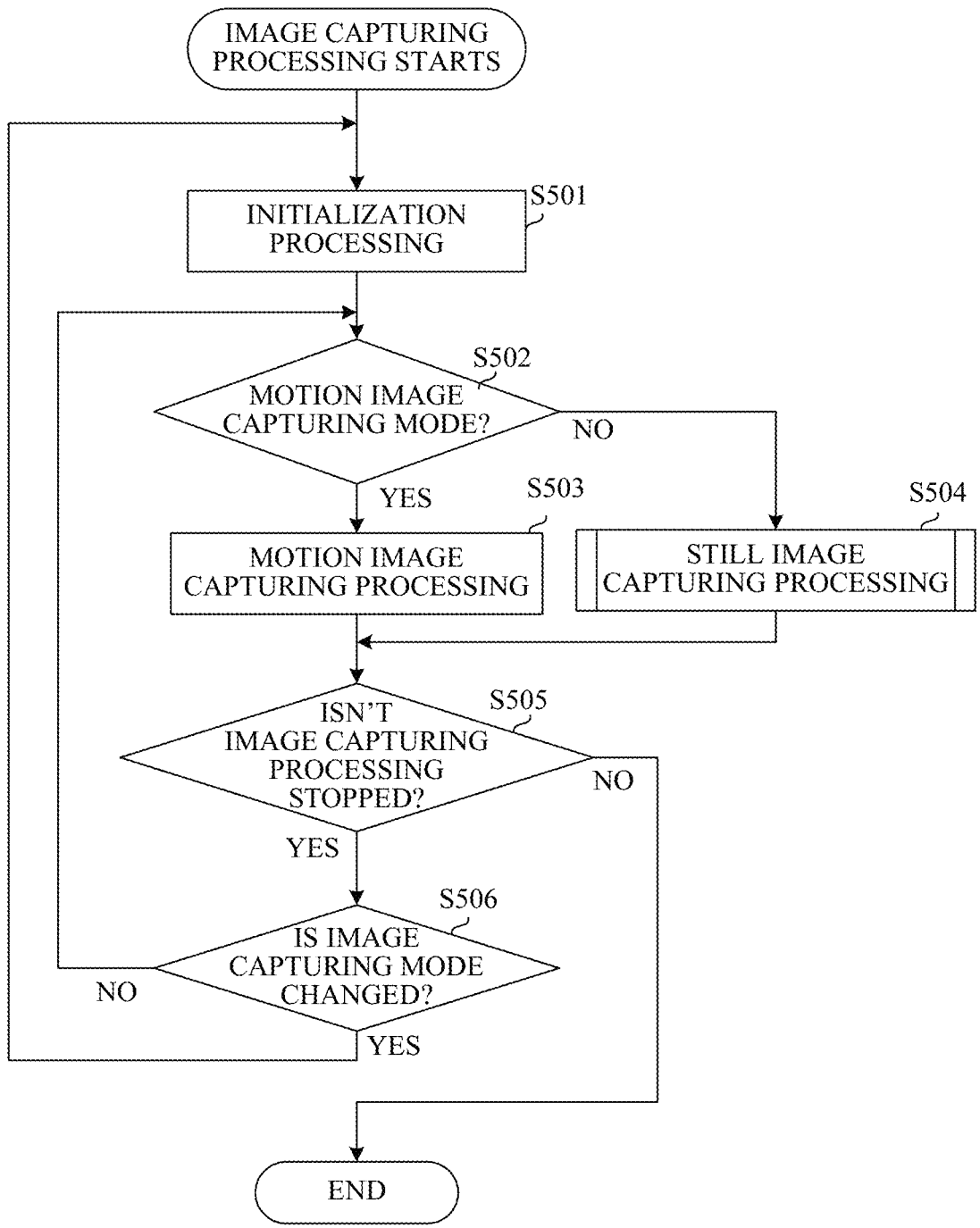
FIG. 5 is a flowchart illustrating image capturing processing according to the first to fourth embodiments.

Referring now to FIG. 5, a description will be given of image capturing processing of the camera body 20 executed by the camera controller 214. FIG. 5 is a flowchart illustrating image capturing processing. The camera controller 214 performs this processing according to an image capturing processing program as a computer program.

In the step S501, the camera controller 214 performs initialization processing such as a camera setting. In the step S502, the camera controller 214 determines whether an imaging mode of the camera body 20 is a motion image capturing mode. In case of the motion image capturing mode, the flow proceeds to the step S503, and in case of the non-motion image capturing mode or the still image capturing mode, the flow proceeds to the step S504. In the step S503, the camera controller 214 performs the motion image capturing processing.

In the step S504, the camera controller 214 performs the still image capturing processing. In the step S505, the camera controller 214 determines whether the image capturing processing has been stopped. In this embodiment, operations other than image capturing, such as power-off processing of the camera body 20, setting processing of the camera body 20 by the user, and reproduction processing for checking captured still and motion images, are performed through the camera operator 208, and the image capturing processing ends. When it has not been stopped, the flow proceeds to the step S506, and when stopped, the image capturing processing ends.

In the step S506, the camera controller 214 determines whether the imaging mode has been changed. When it has been changed, the flow returns to the step S501, and the camera controller 214 executes the image capturing processing in the changed image capturing mode after performing the initialization processing. On the other hand, when it has not been changed, the flow returns to the step S502, and the camera controller 214 continues the image capturing processing in the current imaging mode.

Figure 6:
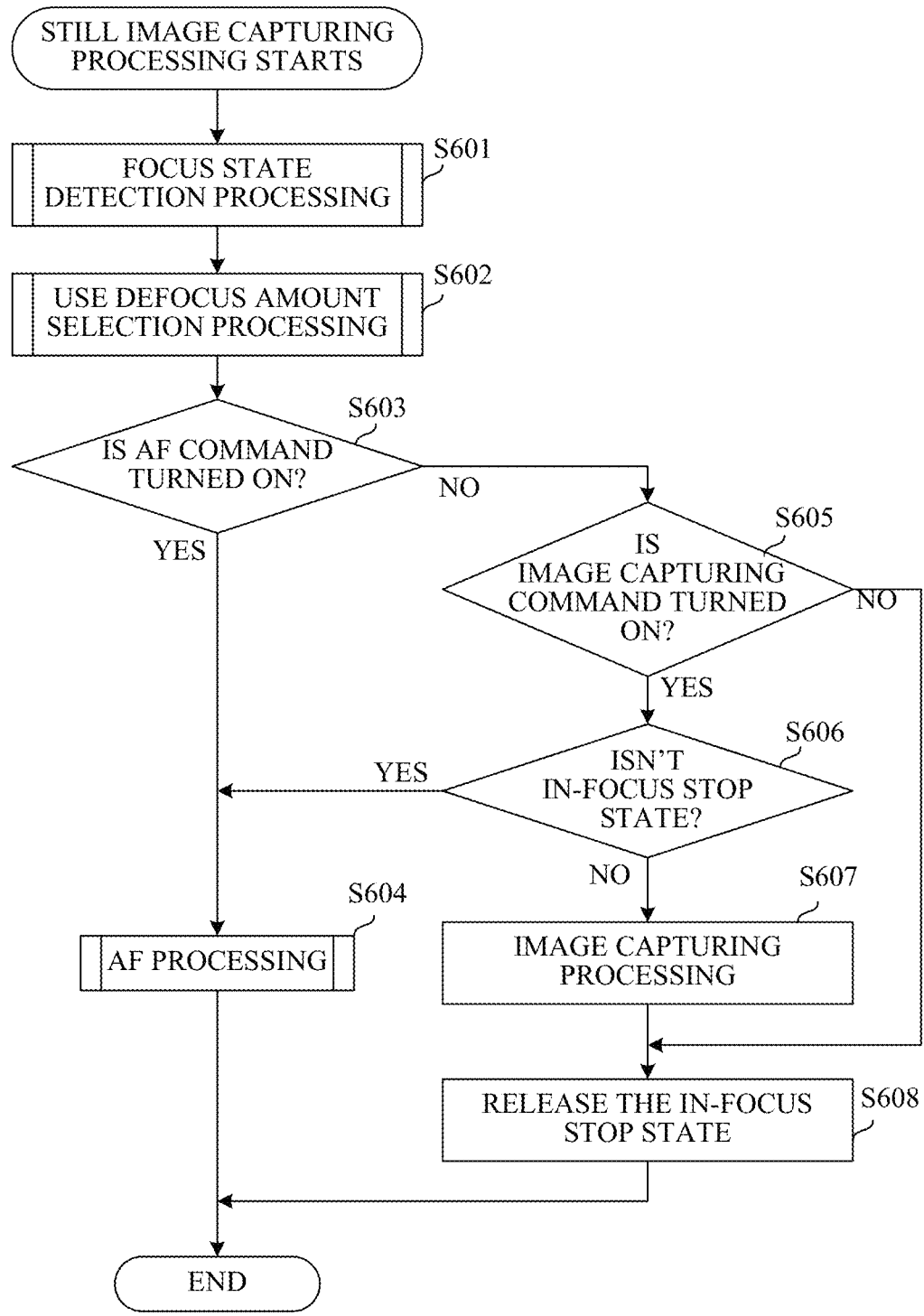
FIG. 6 is a flowchart illustrating still image capturing processing according to the first to fourth embodiments.

Referring now to FIG. 6, a description will be given of the still image capturing processing performed in the step S504 in FIG. 5. FIG. 6 is a flowchart illustrating the still image capturing processing. In the step S601, the camera controller 214 enables the AF signal processor 204 to perform focus state detection processing. The focus state detection processing is processing of acquiring a defocus amount and reliability information for performing the image plane phase difference AF. The camera controller 214 enables the saturation degree determiner 205 to detect the saturation degree.

In the step S602, the use defocus amount selector 215 selects a defocus amount used for the AF control based on the saturation degree detected by the saturation degree determiner 205 and the reliability information calculated by the AF signal processor 204. In the step S603, the camera controller 214 determines whether an AF processing start command (referred to as an "AF command" hereinafter) has been input (turned on) from the camera operator 208. The AF command is output from the camera operator 208 when a shutter button provided on the camera body 20 is half-pressed or when an AFON button for executing the AF is pressed. When the AF command has been input, the flow proceeds to the step S604, and when the AF command has not been input, the flow proceeds to the step S605.

In the step S604, the camera controller 214 performs the AF processing. In the step S605, the camera controller 214 determines whether an image capturing processing start command (referred to as an "image capturing command" hereinafter) has been input (turned on) from the camera operator 208. The image capturing command is output from the camera operator 208 when the shutter button is fully pressed. If the image capturing command has been input, the flow proceeds to the step S606, and when the image capturing command has not been input, the flow proceeds to the step S608.

In the step S606, the camera controller 214 determines whether the imaging optical system is in an in-focus state by the AF processing in the step S604 and whether the focus lens 103 is stopped state (in-focus stop state). If the in-focus stop state is not set, the flow proceeds to the step S604, and if the in-focus stop state is set, the flow proceeds to the step 607. In the step S607, the camera controller 214 performs image capturing processing and stores the captured image (recorded image) in the recording medium 210 via the recording medium controller 209.

Figure 7:
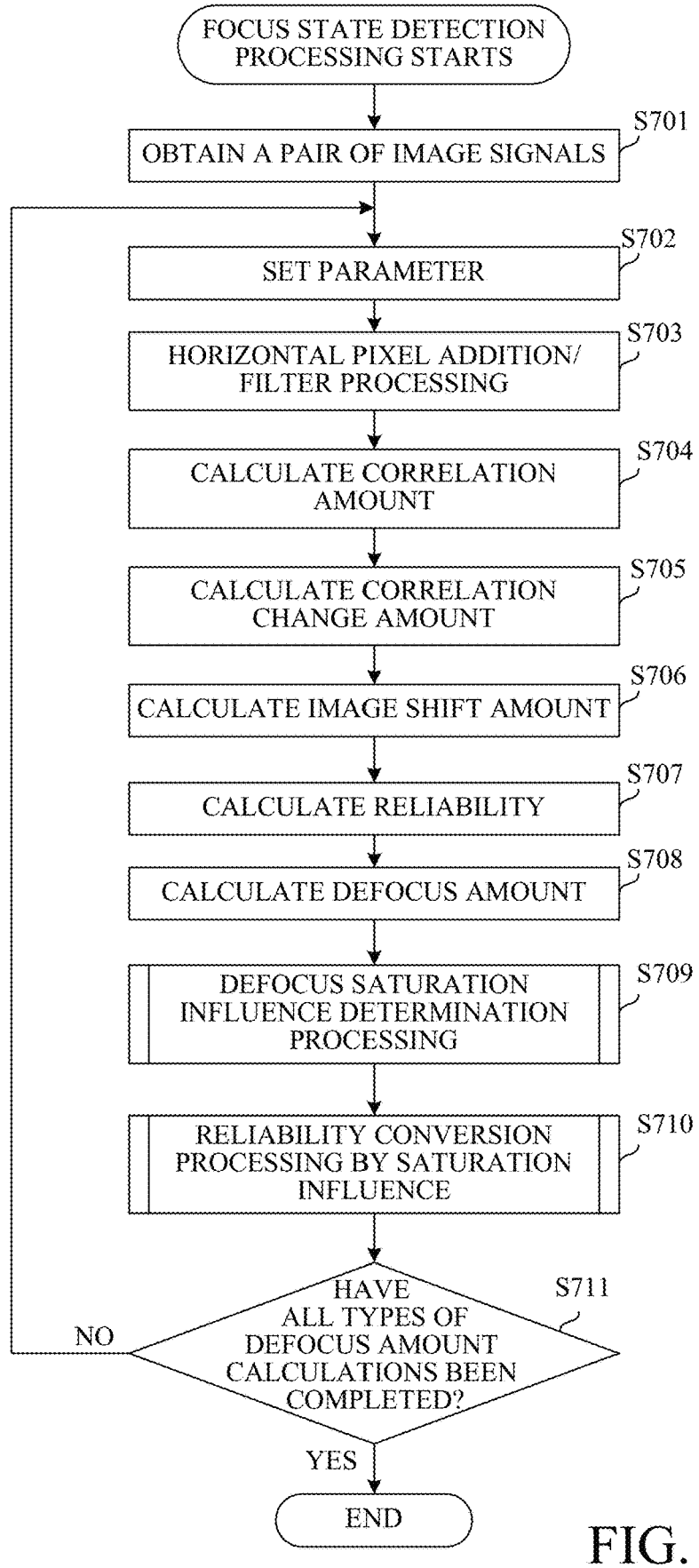
FIG. 7 is a flowchart illustrating focus state detection processing according to the first, third, and fourth embodiments.

In the step S608, the camera controller 214 releases the in-focus stop state. Referring now to FIG. 7, a description will be given of the focus state detection processing performed by the AF signal processor 204 and the saturation degree determiner 205 in the step S601 in FIG. 6. FIG. 7 is a flowchart illustrating the focus state detection processing. The AF signal processor 204 includes a microcomputer and performs the focus state detection processing according to a focus detection program (which may be part of the image capturing processing program) as a computer program.

In the step S701, the AF signal processor 204 acquires a pair of image signals as AF signals from a plurality of pixels in the AF area in the image captured by the image sensor 201. In the step S702, the AF signal processor 204 sets a parameter for detecting the focus state. More specifically, the parameter (setting condition) contains a visual field range for performing a correlation operation, a shift amount, a horizontal pixel addition number, a filter setting, a conversion coefficient for converting the image shift amount into a defocus amount, and the like. The parameter also contains a first threshold (saturated row number threshold), a saturated row determination range, a second threshold (saturated pixel determination threshold), and the like, used to determine the saturation degree by the saturation degree determiner 205.

In the step S703, the AF signal processor 204 performs horizontal pixel addition processing for the pair of image signals acquired in the step S701 based on the horizontal pixel addition number set in the step S702. For example, when the horizontal pixel addition number is 2, two adjacent pixels are added (or averaged), and the subsequent processing handles them as one pixel. When the horizontal pixel addition number is 1, no pixel is added and the pair of image signals acquired in the step S701 are handled as they are. The increased horizontal pixel addition number can reduce frequencies of the pair of image signals. Thereby, although the calculation accuracy of the image shift amount lowers, the image shift amount detection performance for a blurred object can be improved. The AF signal processor 204 applies a digital filter, such as a low-pass filter or a bandpass filter, to the pair of image signals for which the horizontal pixel addition processing is performed. More specifically, the AF signal processor 204 lowers the frequency of the image signal through the low-pass filter, emphasizes a specific frequency in the image signal through the bandpass filter, and cuts off the DC component. A plurality of settings may be set to the horizontal pixel addition number and the filter coefficient in the bandpass filter from a higher frequency setting with a higher focusing accuracy to a lower frequency setting for an image shift amount detection in the defocus state, and the setting may be properly used according to the object blur degree. This embodiment may calculate a plurality of defocus amounts based on a plurality of settings and selectively use the plurality of defocus amounts. The following description according to this embodiment calculates four types of defocus amounts of the low band/long visual field, the high band/long visual field, the low band/short visual field, and the high band/short visual field. The low band is a bandpass filter which has a large horizontal pixel addition number or transmits the low band more, and the low band is opposite to the high band.

In the step S704, the AF signal processor 204 relatively shifts, by one pixel (one bit), the signals obtained by performing the horizontal pixel addition processing and the filter processing for the acquired pair of image signals, and calculates a correlation amount between these signals. The correlation amount is calculated for each of a plurality of pixel lines (referred to as "scan lines" hereinafter) in the AF area. After the correlation amount of each scan line is calculated, the correlation amounts are averaged to calculate one correlation amount. This embodiment relatively shift the pair of image signals by one pixel in calculating the correlation amount, but they may shift them by more pixels. For example, they may be relatively shifted by two pixels. This embodiment calculates one correlation amount by averaging the correlation amounts for each scan line but, for example, a pair of image signals may be averaged for each scan line and thereafter the correlation amount may be calculated based on the averaged pair of image signals.

In the step S705, the AF signal processor 204 calculates a correlation change amount based on the correlation amount calculated in the step S704. In the step S706, the AF signal processor 204 calculates an image shift amount using the correlation change amount calculated in the step S705. In the step S707, the AF signal processor 204 calculates the reliability of the image shift amount calculated in the step S706. In the step S708, the AF signal processor 204 calculates the defocus amount in the AF area by using the image shift amount in the AF area calculated in the step S706. This embodiment calculates four types of defocus amounts, as described above.

In the step S709, the saturation degree determiner 205 performs the defocus saturation influence determination processing for each of the four kinds of defocus amounts. In the step S710, the saturation degree determiner 205 performs conversion processing for each reliability calculated in the step S707 based on the result of the defocus saturation influence determination processing in the step S709. In the step S711, the AF signal processor 204 determines whether it has completed calculating all types of the defocus amounts in the same frame for the pair of image signals acquired in the step S701. When it has completed, the focus detection processing ends, and when it has not completed, the flow returns to the step S702.

Figure 8:
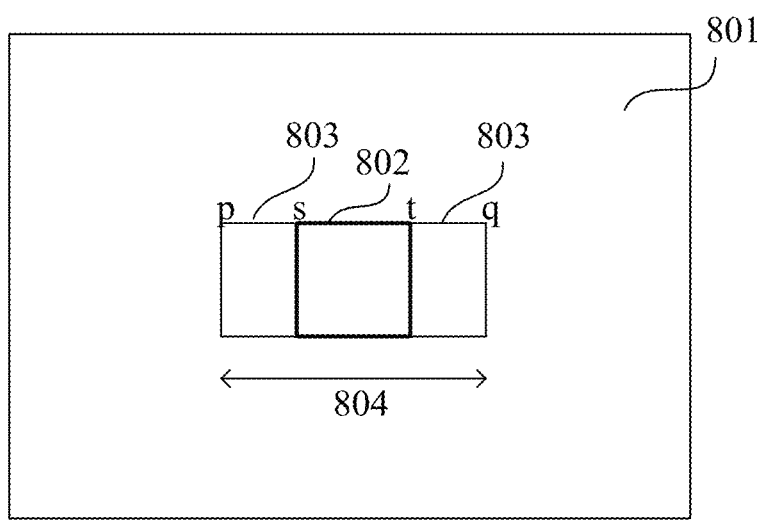
FIG. 8 illustrates an AF area.

A description will now be given of a method of calculating a focus evaluation value by the AF signal processor 204. The focus evaluation value is one of a correlation value, a correlation change value, an image shift amount, and a defocus amount. FIG. 8 illustrates an illustrative AF area 802 on a pixel array 801 in the image sensor 201. Shift areas 803 on both sides of the AF area 802 are necessary for the correlation calculation. An area 804 that includes the AF area 802 and the shift areas 803 is a pixel area necessary for the correlation calculation. In this figure, each of p, q, s, and t represents a coordinate in the horizontal direction, respectively. The coordinates p and q are coordinates of a start point and an end point in the area 804, and the coordinates s and t are coordinates of a start point and an end point in the AF area 802, respectively.

Figure 9A:
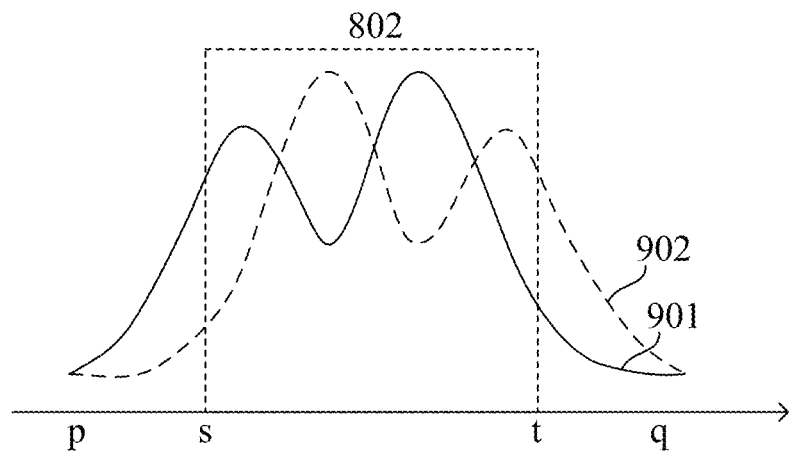
FIGS. 9A to 9C illustrate a pair of image signals obtained from the AF area illustrated in FIG. 8.
Figure 9B:
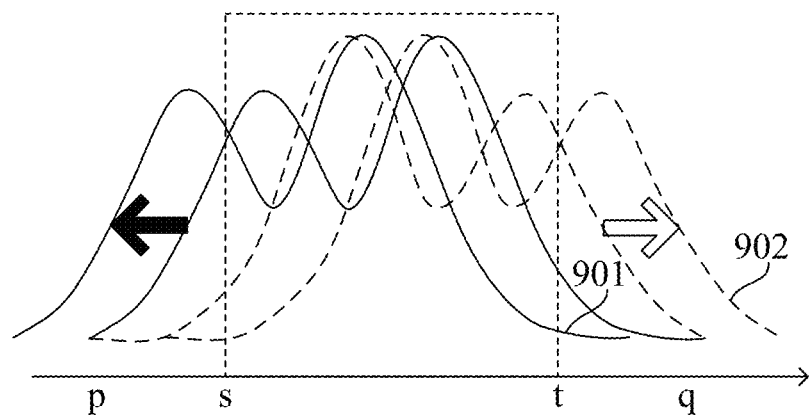
Figure 9C:
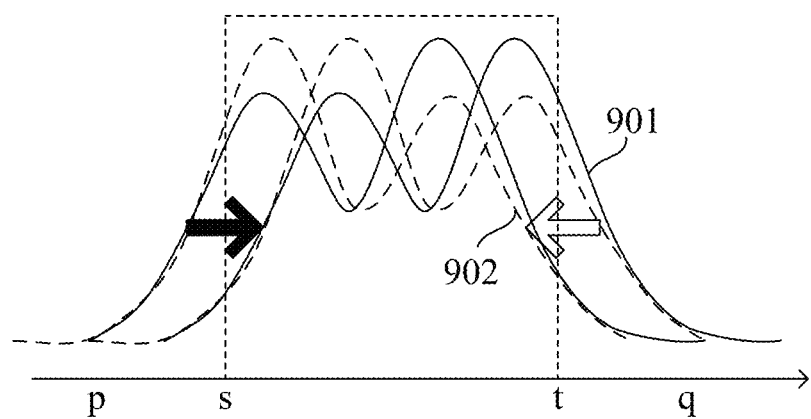

FIGS. 9A to 9C illustrate examples of a pair of AF image signals acquired from a plurality of pixels contained in the AF area 802 in FIG. 8. A solid line 701 indicates one image signal A, and a broken line 802 indicates the other image signal B. FIG. 9A illustrates the image signals A and B before the shift, and FIGS. 9B and 9C illustrate the image signals A and B shifted from the state of FIG. 9A, respectively.

In calculating a correlation amount between the image signals A and B, as illustrated in FIGS. 9B and 9C, the image signals A and B are shifted by one bit in an arrow direction, and a sum of an absolute value of a difference between the image signals A and B is calculated. A correlation amount COR is calculated by the following expression (1) where i is a shift amount, p-s is a maximum shift amount in a minus direction, q-t is a maximum shift amount in a plus direction, x is a start coordinate of the AF area 802, and y is an end coordinate of the AF area 802.

$$COR[i] = \sum_{k=x}^{y} |A[k+i] - B[k-i]| \qquad (1)$$

$$\{(p-s < i < (q-t)\}$$

Figure 10A:
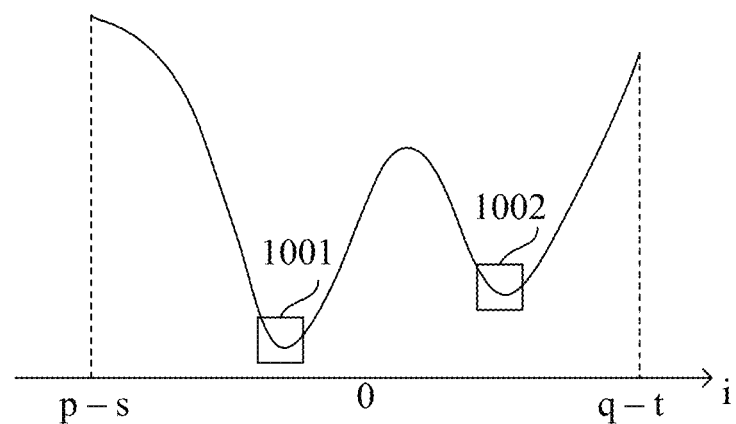
FIGS. 10A and 10B illustrate a relationship between a shift amount between the pair of image signals and a correlation amount illustrated in FIGS. 9A to 9C.

FIG. 10A illustrates an illustrative relationship between the shift amount and the correlation amount COR. The abscissa axis represents the shift amount, and the ordinate axis represents the correlation amount COR. The coincidence degree between the pair of image signals A and B becomes the highest in the shift amount corresponding to a smaller correlation amount among points 1001 and 1002 near the extreme value of the correlation amount. This embodiment calculates a difference in the correlation amount at every other shift as the correlation change amount ΔCOR. The correlation change amount ΔCOR is calculated by the following expression (2) where i is a shift amount, p-s is a maximum shift amount in the minus direction, and q-t is a maximum shift amount in the plus direction.

$$\Delta COR[i] = COR[i-1] - COR[i+1]\{(p-s+1) < i < (q-t-1)\} \qquad (2)$$

Figure 11A:
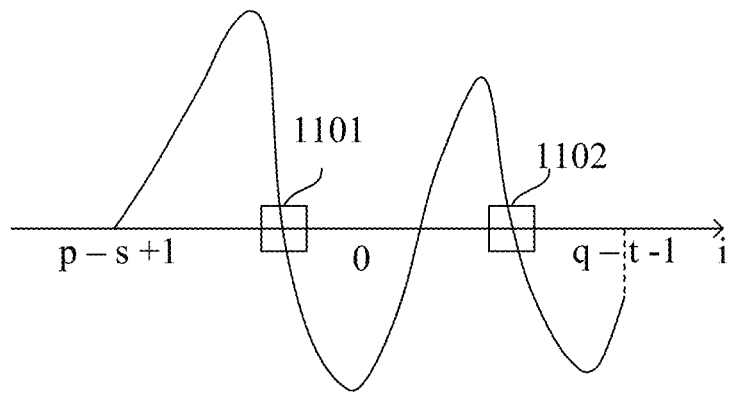
FIGS. 11A and 11B illustrate a relationship between the shift amount between the pair of image signals and a correlation change amount illustrated in FIGS. 9A to 9C.

FIG. 11A illustrates an illustrative relationship between the shift amount and the correlation change amount ΔCOR. The abscissa axis represents the shift amount, and the ordinate axis represents the correlation change amount ΔCOR. The correlation change amount changes from plus to minus in the portions indicated by 1101 and 1102. The position at which the amount of correlation change is 0 is called a zero cross, and provides the highest coincidence degree between the image signals A and B. The shift amount providing the zero cross is the image shift amount.

Figure 11B:
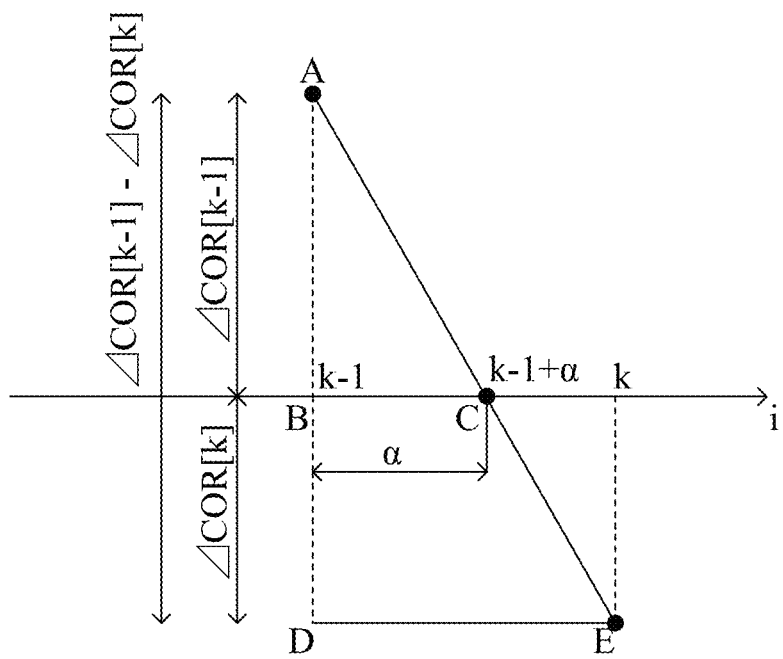

FIG. 11B is an enlarged view of the portion 1101 in FIG. 11A. A shift amount that provides the zero cross or an image shift amount PRD is divided into an integer part β and a decimal part α. The decimal part α is calculated by the following expression (3) based on a similarity relationship between a triangle ABC and a triangle ADE.

$$AB:AD = BC:DE \qquad (3)$$

-continued $$\Delta COR[k-1]:\Delta COR[k-1]-\Delta COR[k]=\alpha:k-(k-1)$$

$$\alpha=\frac{\Delta COR[k-1]}{\Delta COR[k-1]-\Delta COR[k]}$$

The integer part β is calculated by the following expression (4).

$$\beta=k-1 \qquad (4)$$

As illustrated in FIG. 11A, when there are a plurality of zero crosses of the correlation change amount ΔCOR, a zero cross that provides the steepest change of the correlation change amount ΔCOR among them is the largest is set to a first zero cross. This steepness is an index illustrating the efficiency of the AF and indicates that a larger value means a more accurate AF is available. The steepness maxder is calculated by the following expression (5).

$$\max\,\mathrm{der}=|\Delta COR[k-1]|+|\Delta COR[k]| \qquad (5)$$

Thus, when there are a plurality of zero crosses of the correlation change amount, this embodiment determines the first zero cross based on the steepness, and sets the shift amount giving the first zero cross to the image shift amount.

The reliability of the image shift amount can be defined based on the coincidence degree (referred to as a "two-image coincidence degree" hereinafter) fnclvl between the image signals A and B and the steepness of the correlation change amount. The two-image coincidence degree is an index representing the accuracy of the image shift amount, and its smaller value means a higher accuracy in the correlation calculation method according to this embodiment.

Figure 10B:
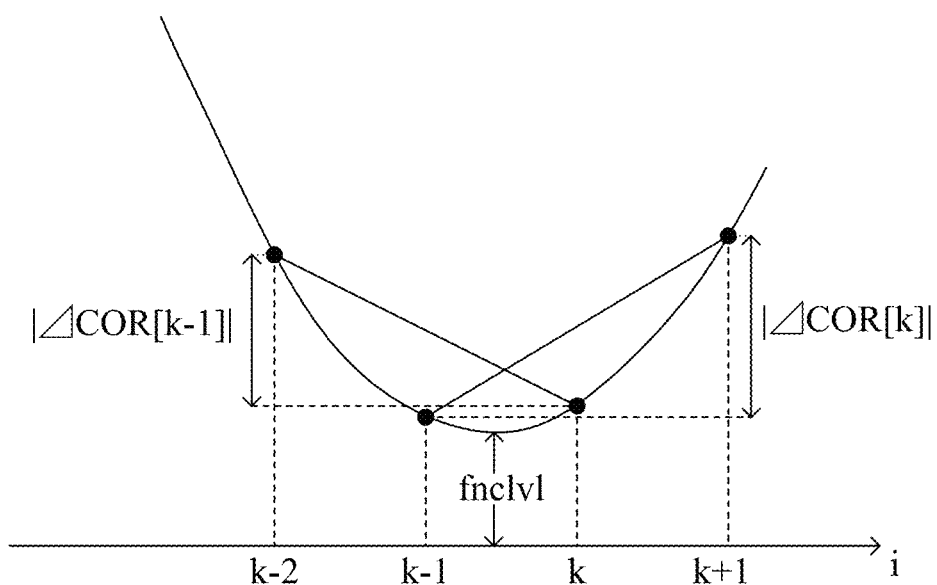

FIG. 10B is an enlarged view of an extreme value part 1001 in FIG. 10A. The two-image coincidence degree fnclvl is calculated by the following expression (6).

(i) When $|\Delta COR[k-1]|\times 2<\max\,\mathrm{der}$:

$$fnclvl=COR[k-1]+\Delta COR[k-1]/4$$

(ii) When $|\Delta COR[k-1]|\times 2>\max\,\mathrm{der}$:

$$fnclvl=COR[k]-\Delta COR[k]/4 \qquad (6)$$

Figure 12:
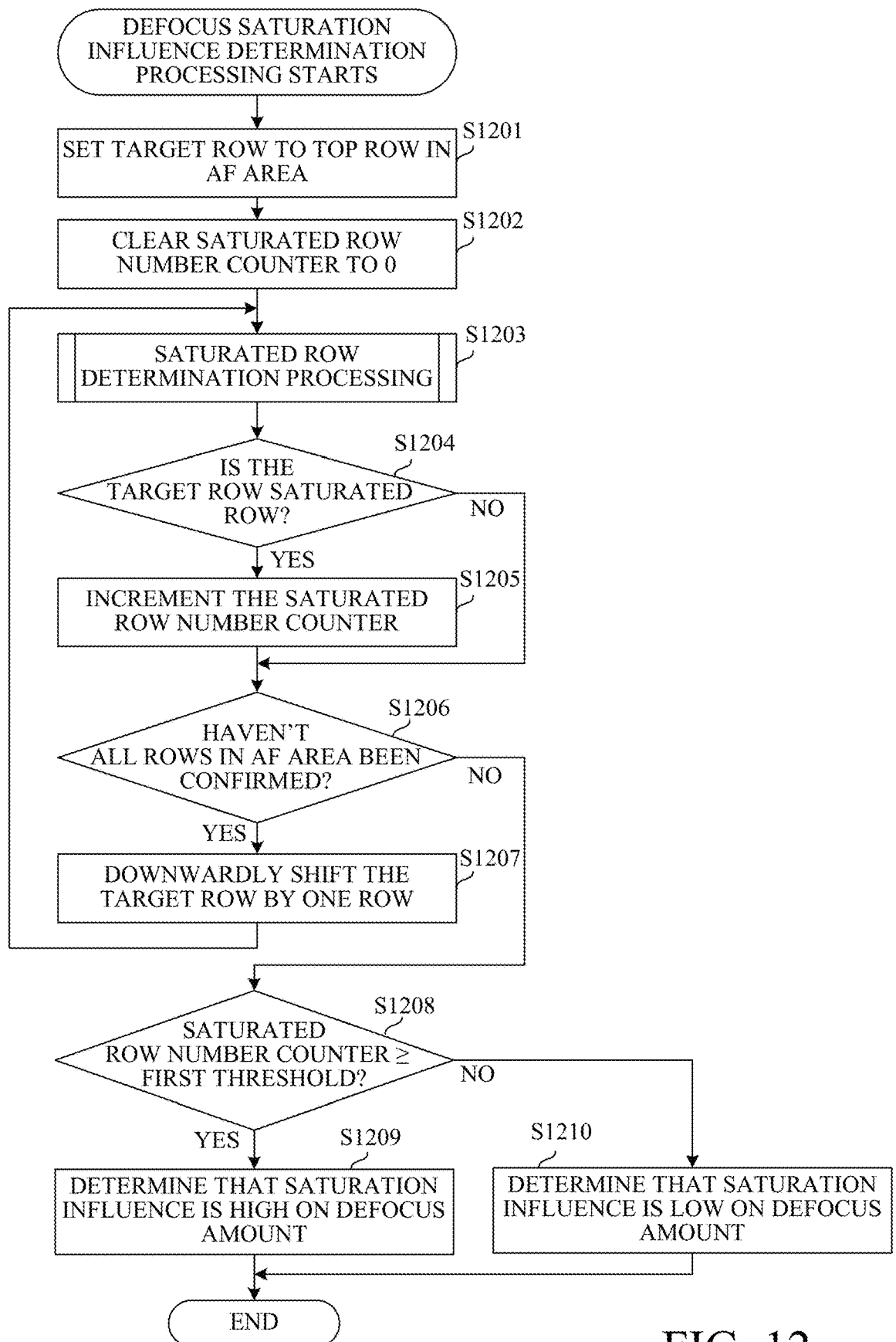
FIG. 12 is a flowchart illustrating defocus saturation influence determination processing according to the first to fourth embodiments.

Referring now to FIG. 12, a description will be given of defocus saturation influence determination processing performed by the saturation degree determiner 205 in the step S709 in FIG. 7. This embodiment performs the defocus saturation influence determination processing for each of the defocus amounts of the low band/long visual field, the high band/long visual field, the low band/short visual field, and the high band/short visual field.

In the step S1201, the saturation degree determiner 205 sets a saturated row confirmation target row ("target row" hereinafter) to the top row in the AF area. In the step S1202, the saturation degree determiner 205 clears a saturated row number counter to 0. In the step S1203, the saturation degree determiner 205 performs saturated row determination processing. In the step S1204, the saturation degree determiner 205 determines whether the target row is a saturated row. When it is the saturated row, the flow proceeds to the step S1205, and when it is not the saturated row, the flow proceeds to the step S1206.

In the step S1205, the saturation degree determiner 205 increments the saturated row number counter. In the step S1206, the saturation degree determiner 205 determines whether the saturation determination has not been completed for all rows in the AF area. If it has not been completed, the flow proceeds to the step S1207, and if it has been confirmed, the flow proceeds to the step S1208. In the step S1207, the saturation degree determiner 205 downwardly shifts the target row by one row. In the step S1208, the saturation degree determiner 205 determines whether the saturated row number counter is equal to or larger than a previously set first threshold. If the saturated row number counter is greater than or equal to the first threshold, the flow proceeds to the step S1209. If the saturation row number counter is smaller than the first threshold, the flow proceeds to the step S1210. In this embodiment, when the saturated row number counter is equal to the first threshold, the flow proceeds to the step S1209, but may proceed to the step S1210.

Figure 13:
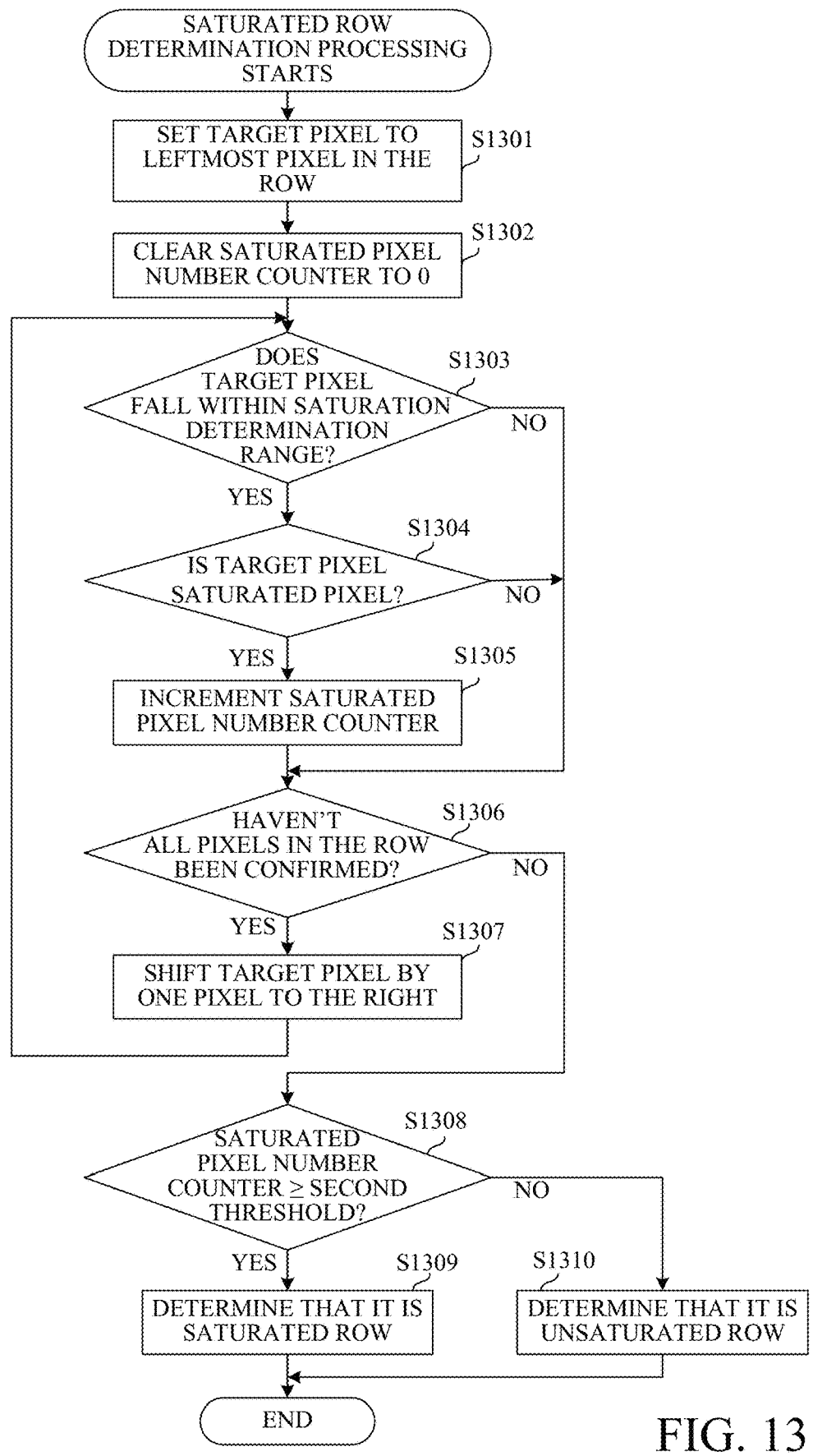
FIG. 13 is a flowchart illustrating a saturated row determination processing according to the first to fourth embodiments.

In the step S1209, the saturation degree determiner 205 determines that the saturation influence on the defocus amount is high. In the step S1210, the saturation degree determiner 205 determines that the saturation influence on the defocus amount is low. Referring now to FIG. 13, a description will be given of the saturated row determination processing performed by the saturation degree determiner 205 in the step S1203 in FIG. 12. In the step S1301, the saturation degree determiner 205 sets a saturated pixel confirmation target pixel ("target pixel" hereinafter) to the leftmost pixel in the target row. In the step S1302, the saturation degree determiner 205 clears the saturated pixel number counter to 0.

In the step S1303, the saturation degree determiner 205 determines whether the target pixel falls within the saturation determination range. If it falls within the saturation determination range, the flow proceeds to the step S1304, and if it falls outside the saturation determination range, the flow proceeds to the step S1306. This embodiment determines whether the area captured as the visual field is saturated, determines that the visual field area, the area of the horizontally added pixel to be used in the visual field area, and the area of the filter pixel fall within the saturation determination range, and determines that the shift area does not fall within the saturation determination range.

In the step S1304, the saturation degree determiner 205 determines whether the target pixel is a saturated pixel. When it is the saturated pixel, the flow proceeds to the step S1305, and when it is not the saturated pixel, the flow proceeds to the step S1306.

In the step S1305, the saturation degree determiner 205 increments the saturated pixel number counter. In the step S1306, the saturation degree determiner 205 determines whether the saturation determination has been completed for all pixels in the row. If not, the flow proceeds to the step S1307, and if so, the flow proceeds to the step S1308. In the step S1307, the saturation degree determiner 205 shifts the target pixel to the right by one pixel.

In the step S1308, the saturation degree determiner 205 determines whether the saturated pixel number counter is equal to or larger than a preset second threshold. When the saturated pixel number counter is equal to or larger than the second threshold, the flow proceeds to the step S1309, and when it is smaller than the second threshold, the flow proceeds to the step S1310. In this embodiment, when the saturated pixel number counter is equal to the second threshold, the flow proceeds to the step S1309 but may proceed to the step S1310.

In the step S1309, the saturation degree determiner 205 determines that the target row is the saturated row. In the step S1310, the saturation degree determiner 205 determines that the target row is not the saturated row.

Figure 14:
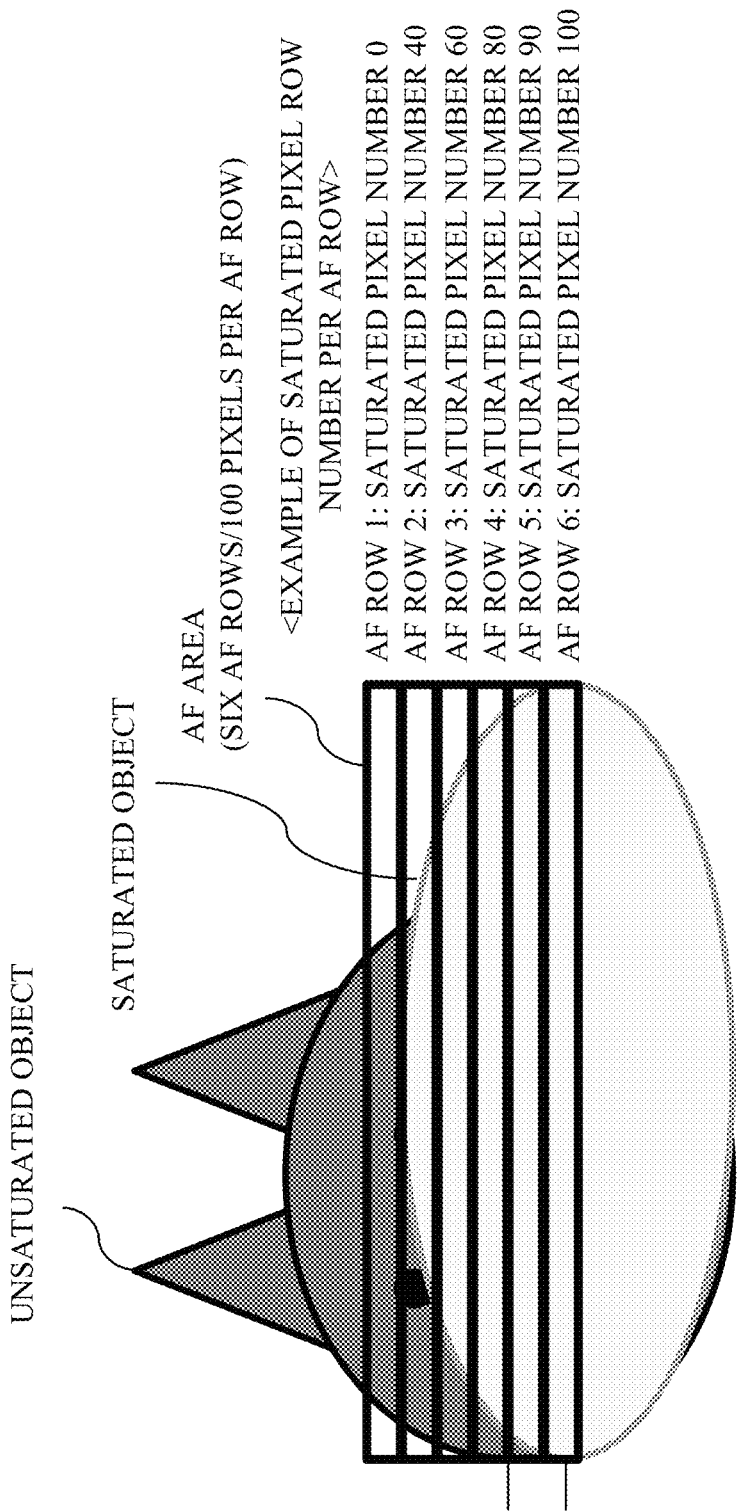
FIG. 14 illustrates the AF area and the number of saturated pixels in each row in the AF area when an unsaturated object and a saturated object are captured.

Referring now to FIG. 14, a description will be given of the defocus saturation influence determination processing described with reference to FIG. 12 and the saturated row determination processing described with reference to FIG. 13. FIG. 14 illustrates the AF area and the number of saturated pixels in each row in the AF area when an unsaturated object and a saturated object are captured. The AF area contains the visual field range area, the area of the horizontally added pixel used for pixels in the visual field range, and the area of the filter pixel, and does not contain the shift area. In other words, only pixels in the saturation determination range in the step S1303 in FIG. 13 are illustrated. The saturated row determination processing in FIG. 13 is performed for each AF row in the AF area (all six rows in FIG. 14). The second threshold in the step S1308 in FIG. 13 may be set depending on whether most pixels in the AF row are saturated. For example, when the second threshold is set so as to provide the saturated row determination when 60% or more saturated pixels per AF row are determined as the saturated row, the second threshold is set to 60 in FIG. 14. In FIG. 14, it is determined that AF rows 1 to 2 are unsaturated rows, and AF rows 3 to 6 are saturated rows. In other words, four rows out of the six AF rows in the AF area are determined as the AF rows, and the saturated row number counter in FIG. 12 becomes 4 in the step S1208. In the step S1208 in FIG. 12, whether the saturation influence on the defocus amount is high is determined based on determining whether the saturated row number counter is larger than the second threshold. For example, assume that the second threshold is set so that that the saturation influence on the defocus amount is high when 60% or more of the AF rows in the AF area are saturated rows. Then, the second threshold is 4 in FIG. 14. In FIG. 14, it is determined that the saturation row number counter is 4, the second threshold is 4, and the saturation influence on the defocus amount is high. As described with reference to FIGS. 4A to 4C, depending on the visual field range, the addition number of horizontally added pixels, and the tap number in the bandpass filter, the saturated pixel determination range is changed even if the same object is captured. Therefore, the result of determining whether it is the saturated row varies, and whether the saturation influence on the defocus amount is high varies. The first threshold and the second threshold are not limited to the above set values in the description in FIG. 14. For example, the first threshold may be set to 1 so that the saturation influence on the defocus amount is determined to be high even if a single row is determined to be a saturated row. At least the first and second thresholds, and the saturation determination range in determining the saturated row are set based on the area of the visual field range, the addition number in horizontally added pixels, and the tap number in the bandpass filter.

Figure 15:
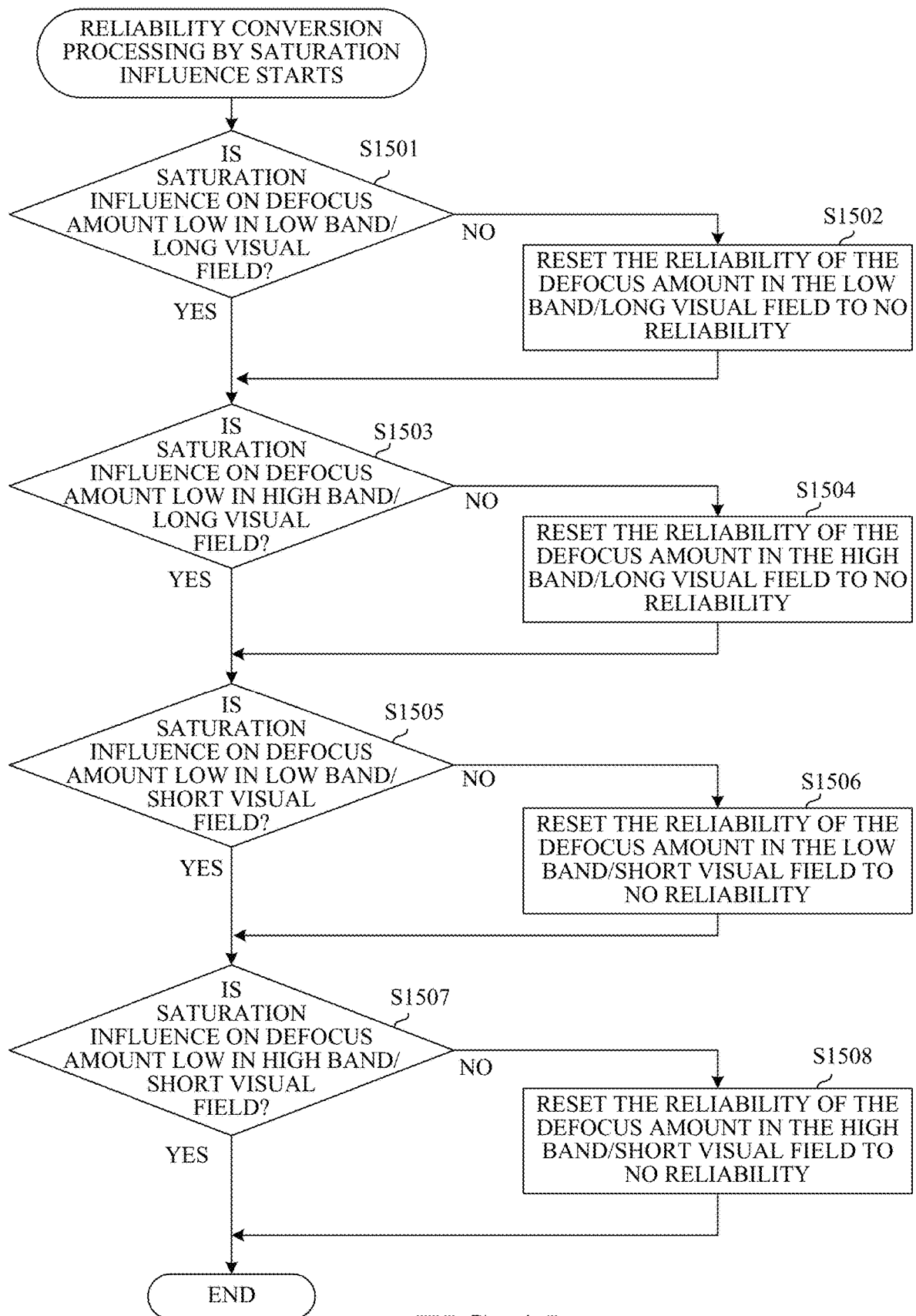
FIG. 15 is a flowchart illustrating reliability conversion processing by a saturation influence according to the first to fourth embodiments.

Referring now to FIG. 15, a description will be given of the reliability conversion processing by the saturation influence performed by the saturation degree determiner 205 in the step S710 in FIG. 7. As described above, this embodiment calculates four types of defocus amounts in the low band/long visual field, the high band/long visual field, the low band/short visual field, and the high band/short visual field in the focus state detection processing in FIG. 7. Hence, the reliability conversion processing based on the saturation influence in FIG. 15 is performed for four types of defocus amounts. When the number of types of the defocus amounts increases or decreases, it is necessary to change the processing number according to the number of types of the defocus amount.

In the step S1501, the saturation degree determiner 205 determines whether the saturation influence on the defocus amount is low in the low band/long visual field. When the saturation influence is low, the flow proceeds to the step S1503, and when the saturation influence is high, the flow proceeds to the step S1502.

In the step S1502, the saturation degree determiner 205 resets the reliability of the defocus amount in the low band/long visual field to no reliability. In the step S1503, the saturation degree determiner 205 determines whether the saturation influence on the defocus amount is low in the high band/long visual field. When the saturation influence is low, the flow proceeds to the step S1505. When the saturation influence is high, the flow proceeds to the step S1504.

In the step S1504, the saturation degree determiner 205 resets the reliability of the defocus amount in the high band/long visual field to no reliability. In the step S1505, the saturation degree determiner 205 determines whether the saturation influence on the defocus amount is low in the low band/short visual field. When the saturation influence is low, the flow proceeds to the step S1507, and when the saturation influence is high, the flow proceeds to the step S1506.

In the step S1506, the saturation degree determiner 205 resets the reliability of the defocus amount in the low band/short visual field to no reliability. In the step S1507, the saturation degree determiner 205 determines whether the saturation influence on the defocus amount is low in the high band/short visual field. When the saturation influence is low, this processing is terminated, and when the saturation influence is high, the flow proceeds to the step S1508.

Figure 16:
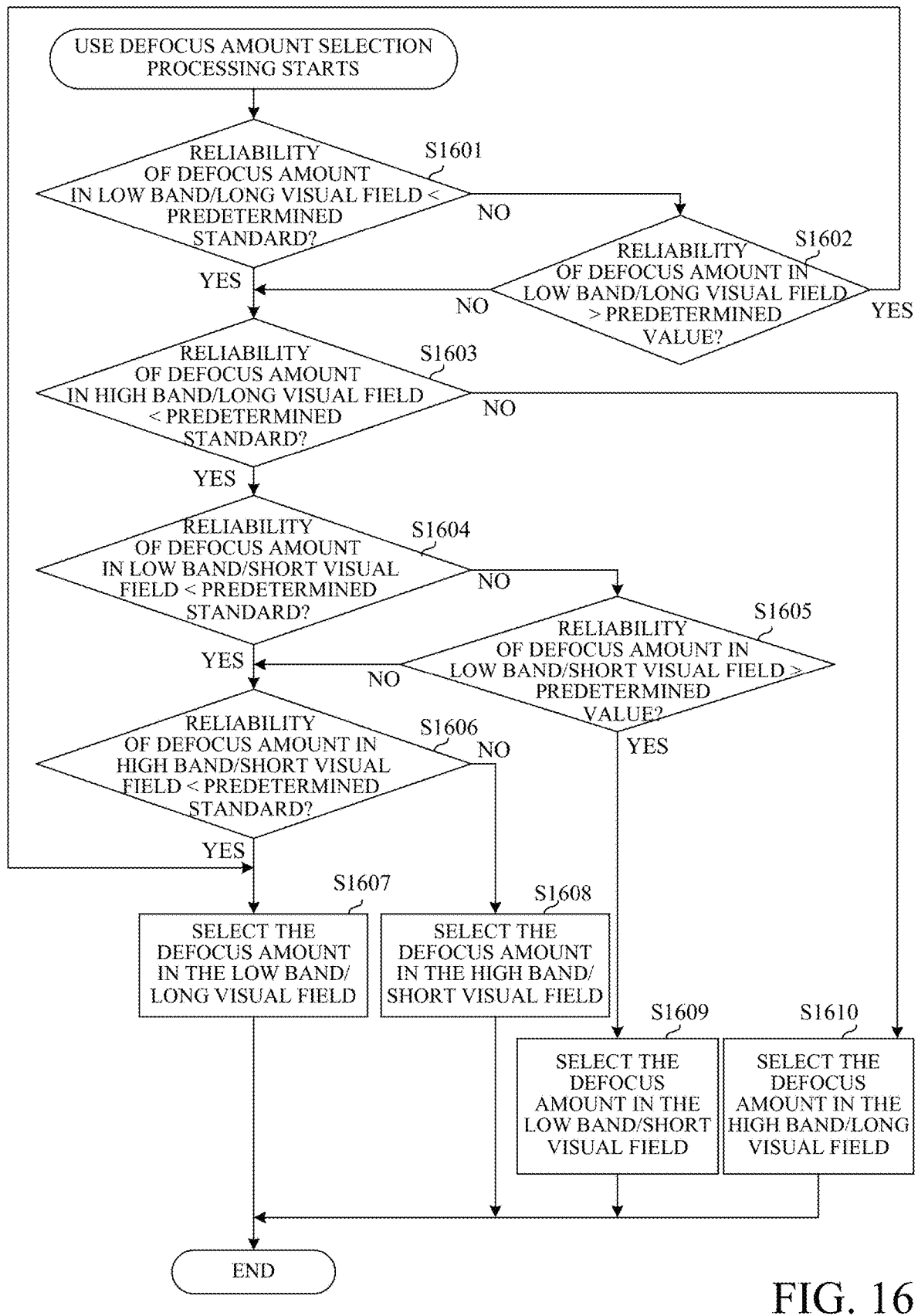
FIG. 16 is a flowchart illustrating use defocus amount selection processing according to the first and second embodiments.

In the step S1508, the saturation degree determiner 205 resets the reliability of the defocus amount in the high band/short visual field to no reliability. Thus, when the saturation influence on the defocus amount is high, the reliability of the defocus amount is set low since the defocus amount is not used. Referring now to FIG. 16, a description will be given of the use defocus amount selection processing performed by the use defocus amount selector 215 in the step S602 in FIG. 6.

In the step S1601, the use defocus amount selector 215 determines whether the reliability of the defocus amount in the low band/long visual field is lower than a predetermined standard. The predetermined standard contains the two-image coincidence degree, the steepness, and whether the explained saturation influence is low. When it is lower than the predetermined standard, the flow proceeds to the step S1603, and when it is higher than the predetermined standard, the flow proceeds to the step S1602.

In the step S1602, the use defocus amount selector 215 determines whether the absolute value of the defocus amount in the low band/long visual field is larger than a predetermined value. When it is larger than the predetermined value, the flow proceeds to the step S1607, and when it is smaller than the predetermined value, the flow proceeds to the step S1603. When the absolute value is equal to the predetermined value, the flow may go to either.

In the step S1603, the use defocus amount selector 215 determines whether the reliability of the defocus amount in the high band/long visual field is lower than a predetermined standard. When it is lower than the predetermined standard, the flow proceeds to the step S1604, and when it is higher than the predetermined standard, the flow proceeds to the step S1610.

In the step S1604, the use defocus amount selector 215 determines whether the reliability of the defocus amount in the low band/short visual field is lower than the predetermined standard. When it is lower than the predetermined standard, the flow proceeds to the step S1606, and when it is higher than the predetermined standard, the flow proceeds to the step S1606.

In the step S1605, the use defocus amount selector 215 determines whether the absolute value of the defocus amount in the low band/short visual field is greater than a predetermined value. When it is larger than the predetermined value, the flow proceeds to the step S1609, and when it is smaller than the predetermined value, the flow proceeds to the step S1606. When the absolute value is equal to the predetermined value, the flow may go to either.

In the step S1606, the use defocus amount selector 215 determines whether the reliability of the defocus amount in the high band/short visual field is lower than a predetermined standard. When it is lower than the predetermined standard, the flow proceeds to the step S1607, and when it is higher than the predetermined standard, the flow proceeds to the step S1608.

In the step S1607, the use defocus amount selector 215 selects the defocus amount in the low band/long visual field. In the step S1608, the use defocus amount selector 215 selects the defocus amount in the high band/short visual field.

In the step S1609, the use defocus amount selector 215 selects the defocus amount in the low band/short visual field. In the step S1610, the use defocus amount selector 215 selects the defocus amount in the high band/long visual field.

In the use defocus amount selection processing in FIG. 16, the reliability of the defocus amount in the long visual field is first determined. In the step S1601, the reliability of the defocus amount in the low band is determined, and in the step S1603, the reliability of the defocus amount in the high band is determined.

When the defocus amount of the low band/long visual field has a high reliability and a large absolute value, it is conceivable that the focus lens 103 shifts from the in-focus position. Then, the defocus amount in the low band/long visual field is selected so that the calculation ability of the image shift amount at the shifted position improves.

When the defocus amount in the low band/long visual field has a small absolute value and the defocus amount of the high band/long visual field has a high reliability, it is conceivable that the focus lens 103 is close to the in-focus position. Then, the defocus amount in the high band/long visual field is selected so that the AF accuracy is high.

When it is determined that the defocus amount in the long visual field has a low reliability, the reliability of the defocus amount in the short visual field is determined. In the step S1604, the reliability in the low band defocus amount is determined, and in the step S1606, the reliability in the high band defocus amount is determined.

When the defocus amount in the low band/short visual field has a high reliability with a large absolute value, it is conceivable that the focus lens 103 shifts from the in-focus position. Then, the defocus amount in the low band/short visual field is selected so that the calculation ability of the image shift amount at the shifted position improves.

When the absolute value of the defocus amount in the low band/short visual field is small and the defocus amount of the high band/short visual field has a high reliability, it is conceivable that the focus lens 103 is close to the in-focus position. Then, the defocus amount in the high band/short visual field is selected so as to make the AF accuracy high.

When the defocus amount in the high band/short visual field has a high reliability, a large defocus state may be conceivable. Then, the defocus amount in the low band/long visual field is selected so that the calculation ability of the image shift amount at the shifted position improves.

As described above, this embodiment excludes the defocus amount determined to have a high saturation influence from the selection candidate, and selects the use defocus amount among those having low saturation influences unless all defocus amounts have low reliability. This embodiment enables the defocus amount in the long visual field to be preferentially selected.

Figure 17:
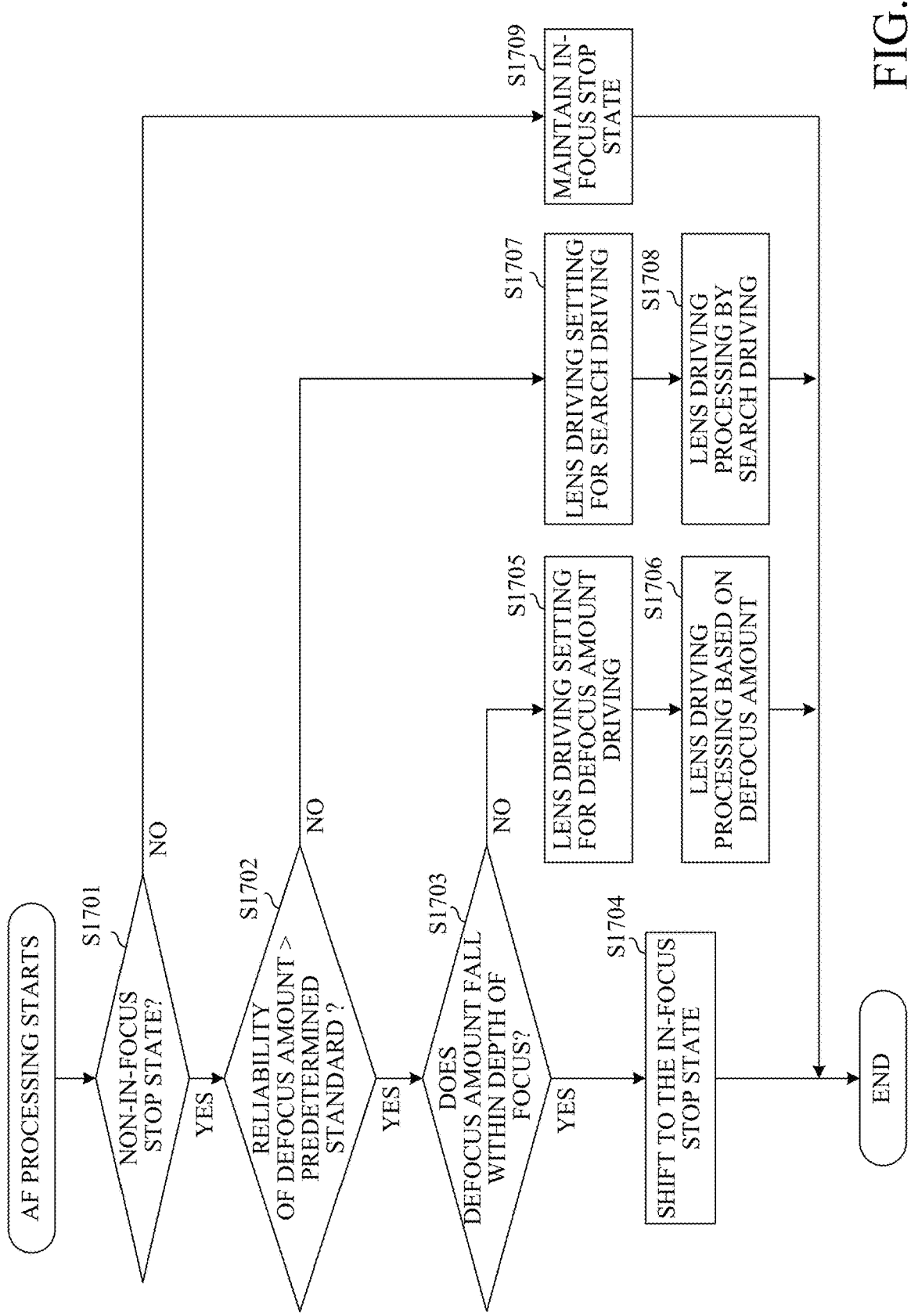
FIG. 17 is a flowchart illustrating AF processing according to the first to fourth embodiments.

Referring now to FIG. 17, a description will be given of the AF processing performed by the camera controller 214 in the step S604 in FIG. 6. The defocus amount in FIG. 17 is one selected in the use defocus amount selection processing.

In the step S1701, the camera controller 214 determines whether the current AF has not been completed and the in-focus stop state has not been obtained. When the in-focus stop state has not been obtained, the flow proceeds to the step S1702, and if the in-focus stop state has been obtained, the flow proceeds to the step S1709.

In the step S1702, the camera controller 214 determines whether the reliability of the defocus amount selected in the use defocus amount selection processing is higher than a predetermined standard. The reliability is calculated based on the two-image coincidence degree, the steepness, and the saturation influence. The reliability may be calculated by using other indices such as the signal levels of the two images. The predetermined standard may have the maximum value in the unreliable range with respect to not only the defocus amount but also the defocus direction. If the reliability of the defocus amount is higher than the predetermined standard, the flow proceeds to the step S1703. When it is lower than the predetermined standard, the flow proceeds to the step S1707.

In the step S1703, the camera controller 214 determines whether the defocus amount falls within the depth of focus because the AF is performed with a reliable defocus amount. If the defocus amount falls within the depth of focus, the flow proceeds to the step S1704, and when it does not fall within the depth of focus, the flow proceeds to the step S1705. In the step S1704, the camera controller 214 considers the defocus amount to be one within the focal depth range and shifts to the in-focus stop state.

In the step S1705, the camera controller 214 considers that no in-focus state is obtained and performs the lens drive setting for driving the focus lens 103 based on the defocus amount. The lens driving setting is a setting such as a driving speed of the focus lens 103 and a gain applied to a defocus amount based on an error of the defocus amount.

In the step S1706, the camera controller 214 transmits a control command of the focus lens 103 to the lens controller 106 based on the defocus amount and the information of the lens driving setting set in the step S1705. In other words, the camera controller 214 performs the focus control.

In the step S1707, in order to detect the position of the focus lens 103 that can provide a reliable defocus amount, the camera controller 214 performs lens driving setting for search driving so as to calculate the defocus amount while moving the focus lens 103 to the movable end. The lens driving setting for the search driving contains settings such as a driving speed and a driving start direction of the focus lens 103.

In the step S1708, the camera controller 214 transmits a control command of the focus lens 103 to the lens controller 106 based on the lens driving setting for the search driving set in the step S1707. In executing the search driving, since all defocus amounts are less reliable in the use defocus amount selection processing, and thus the defocus amount in the low band/long visual field is selected. Since the defocus amount in the low band/long visual field is selected, the defocus amount is likely to be more quickly detected. This embodiment discusses the camera body 20 capable of performing only the image plane phase difference AF using a pair of image signals as the output signal from the image sensor 201. Nevertheless, where the contrast detection type AF is available using the output signal from the image sensor 201, the contrast detection type AF may be temporarily performed when it is determined that the defocus amount is less reliable in the step S1702.

In the step S1409, the camera controller 214 maintains the in-focus stop state. As described above, this embodiment calculates a plurality of defocus amounts having different visual field ranges, addition numbers of horizontally added pixels, and filter taps, and determines the saturation influence for each defocus amount. The threshold and range used to determine the saturation influence are set for each defocus amount based on the visual field range, the addition number of horizontally added pixels, and the tap number in the bandpass filter. Then, this embodiment converts the reliability of the defocus amount according to the magnitude of the saturation influence, and selects the use defocus amount only from the defocus amount having a low saturation influence. Thereby, even when a saturated object exists in the AF area, the AF is performed using a defocus amount having a low saturation influence instead of performing the AF without using the defocus amount, so that the AF is more likely available and the AF accuracy is less likely to lower.

In this embodiment, the image sensor 201 has a configuration capable of performing the correlation calculation in the horizontal direction, but it may have a configuration capable of performing the correlation calculation in the vertical direction or in both the horizontal and vertical directions.

Second Embodiment

The first embodiment sets the first and second thresholds based on the area of the visual field range, the addition number of horizontally added pixels, and the tap number in the bandpass filter. This embodiment sets the first and second thresholds based on other information. The imaging apparatus according to this embodiment has a configuration similar to that of the camera system 1 according to the first embodiment.

A description will now be given of processing performed by the camera body 20 according to this embodiment. The imaging processing, the still image capturing processing, the defocus saturation influence determination processing, the saturated row determination processing, the reliability conversion processing by the saturation influence, the use defocus amount selection processing, and the AF processing according to this embodiment are similar to those in the first processing, a description thereof will be omitted.

Figure 18:
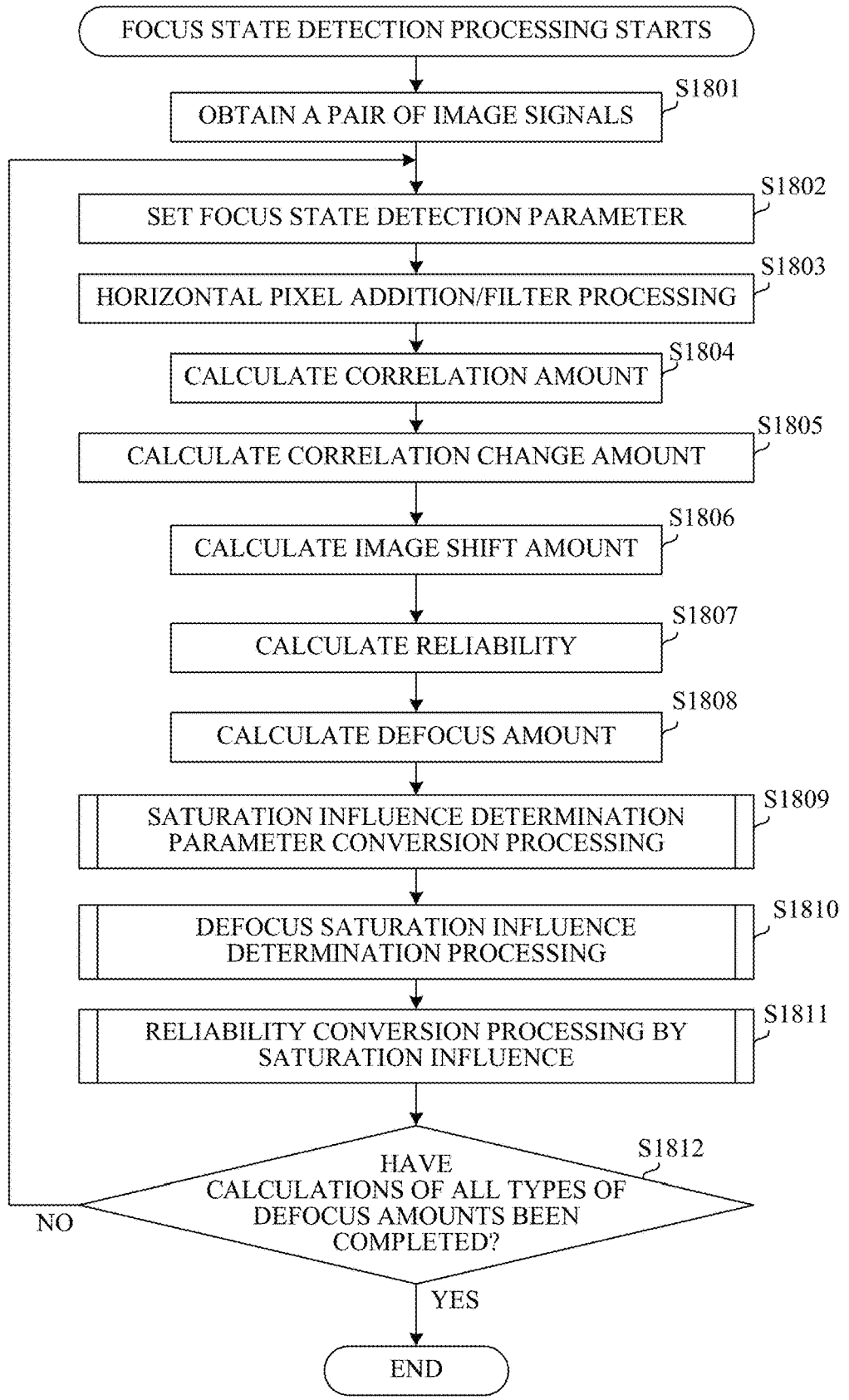
FIG. 18 is a flowchart illustrating focus state detection processing according to the second embodiment.

Referring now to FIG. 18, a description will be given of focus state detection processing performed by the AF signal processor 204 and the saturation degree determiner 205.

The processing from the step S1801 to the step S1808 and the step S1810 to the step S1812 are similar to the processing from the step S701 to the step S711 in FIG. 7, and a description thereof will be omitted. In the step S1809, the AF signal processor 204 performs saturation influence determination parameter conversion processing as conversion processing of the threshold set in the step S1802, used in the defocus saturation influence determination processing.

Figure 19:
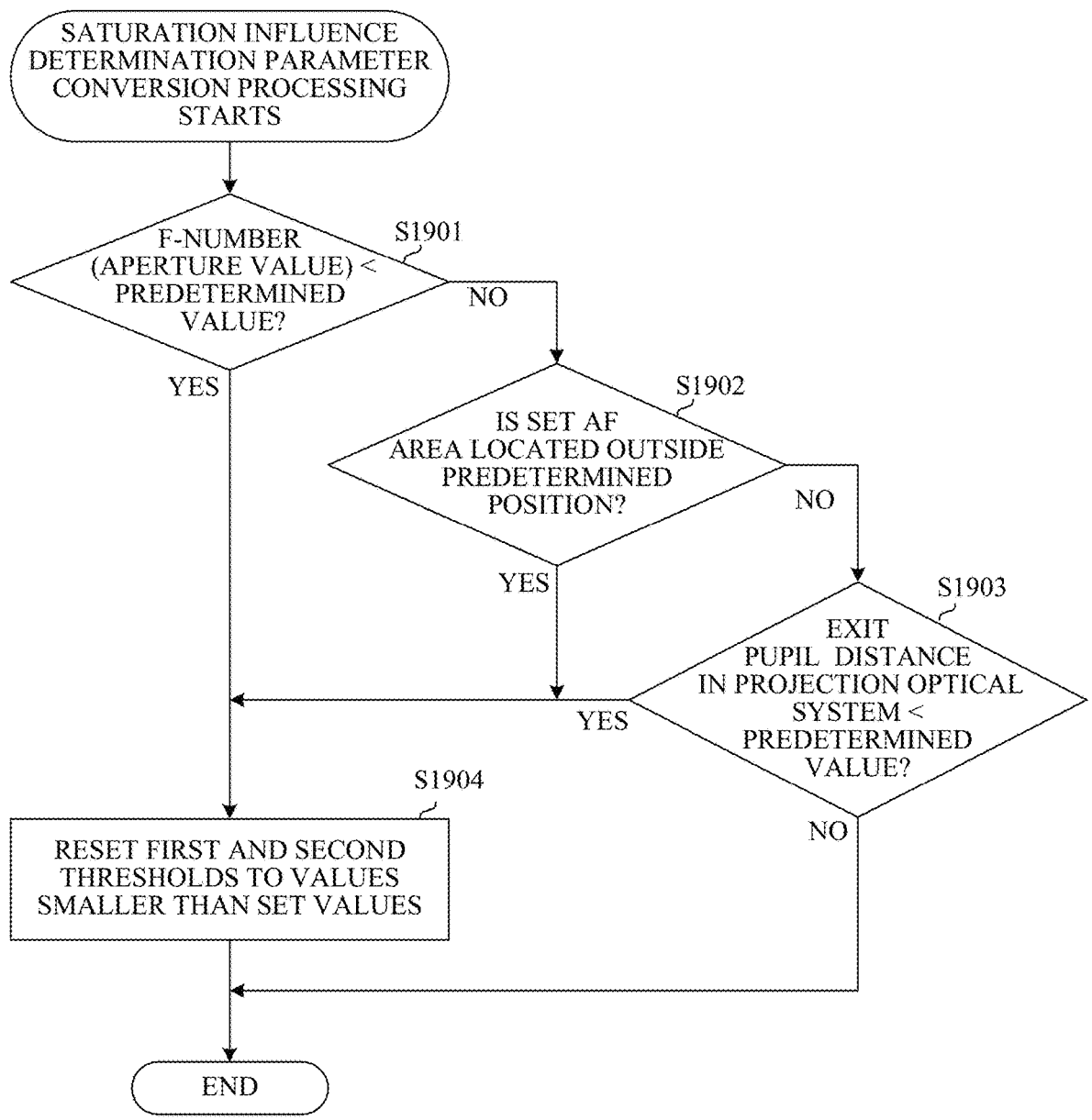
FIG. 19 is a flowchart illustrating saturation influence determination parameter conversion processing according to the second embodiment.

Referring now to FIG. 19, a description will be given of the saturation influence determination parameter determination processing performed by the AF signal processor 204 in the step S1809 in FIG. 18.

In the step S1901, the AF signal processor 204 determines whether the F-number (aperture value) is smaller than a predetermined value. If the F-number is smaller than the predetermined value, the flow proceeds to the step S1904. If the F-number is larger than the predetermined value, the flow proceeds to the step S1902. In the step S1902, the AF signal processor 204 determines whether the position (image height) of the AF area is outside a predetermined position. When it is outside the predetermined position, the flow proceeds to the step S1904, and when it is inside the predetermined position, the flow proceeds to the step S1903.

In the step S1903, the AF signal processor 204 determines whether an exit pupil distance in the imaging optical system is shorter than a predetermined value. When it is shorter than the predetermined value, the flow proceeds to the step S1904, and when it is longer than the predetermined value, this processing is terminated.

In the step S1904, the AF signal processor 204 resets the first and second thresholds to values smaller than the values set in the step S1802.

In the saturation influence determination parameter conversion processing, when the accuracy of AF lowers in the image plane phase difference AF, the first and second thresholds are changed so that the captured saturated object is less likely to be used. The image plane phase difference AF is characterized in a reduced calculation accuracy of the defocus amount and a short baseline length as the diaphragm has a narrower aperture. When the position of the AF area is further outside or the lens exit pupil distance is shorter, a light quantity difference between the A signal and the B signal is likely to be larger, a signal level difference between the A signal and the B signal is likely to occur, and the accuracy of the defocus amount lowers. Under the condition that lowers the AF accuracy, the first and second thresholds are set to values smaller than usual set values so that the AF is less likely available for the saturated object.

The first and second thresholds may be reset so as to be smaller than the usual set values based on the visual field range, the addition number of the horizontally added pixels, and the tap number in the bandpass filter. Where a saturated pixel exists, they may be set to 0 so as to prevent the AF from being used.

As described above, where the accuracy of the AF lowers in the image plane phase difference AF, this embodiment changes the first and second thresholds so that the AF is less likely available in capturing the saturated object.

Third Embodiment

This embodiment changes the use defocus amount selection method based on the size setting of the AF area, where the size of the AF area can be set by operating the camera operator 208. In the following description, the narrow setting and the wide setting, which will be described later, as the size setting of the AF area, have the same sizes on the screen as the short visual field and the long visual field in the visual field range, respectively. The imaging apparatus according to this embodiment have a configuration similar to that of the camera system 1 according to the first embodiment.

A description will now be given of the processing performed by the camera body 20 according to this embodiment. The imaging processing, the still image capturing processing, the focus state detection processing, the defocus saturation influence determination processing, the saturation row determination processing, the reliability conversion processing by the saturation influence, and the AF processing in this embodiment are the same as those described in the first embodiment, and a description thereof will be omitted.

Figure 20A:
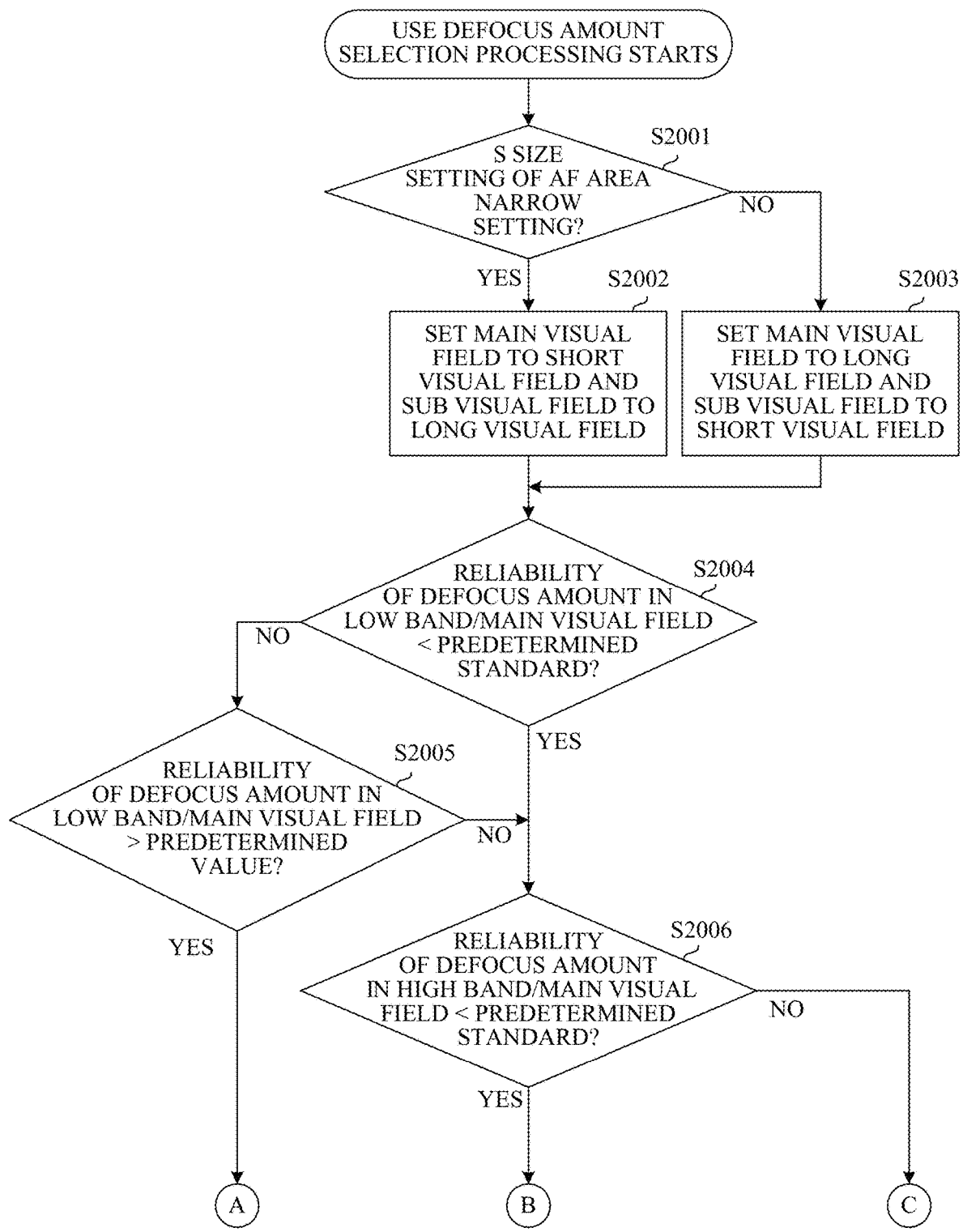
FIGS. 20A and 20B are flowcharts illustrating use defocus amount selection processing according to the third embodiment.
Figure 20B:
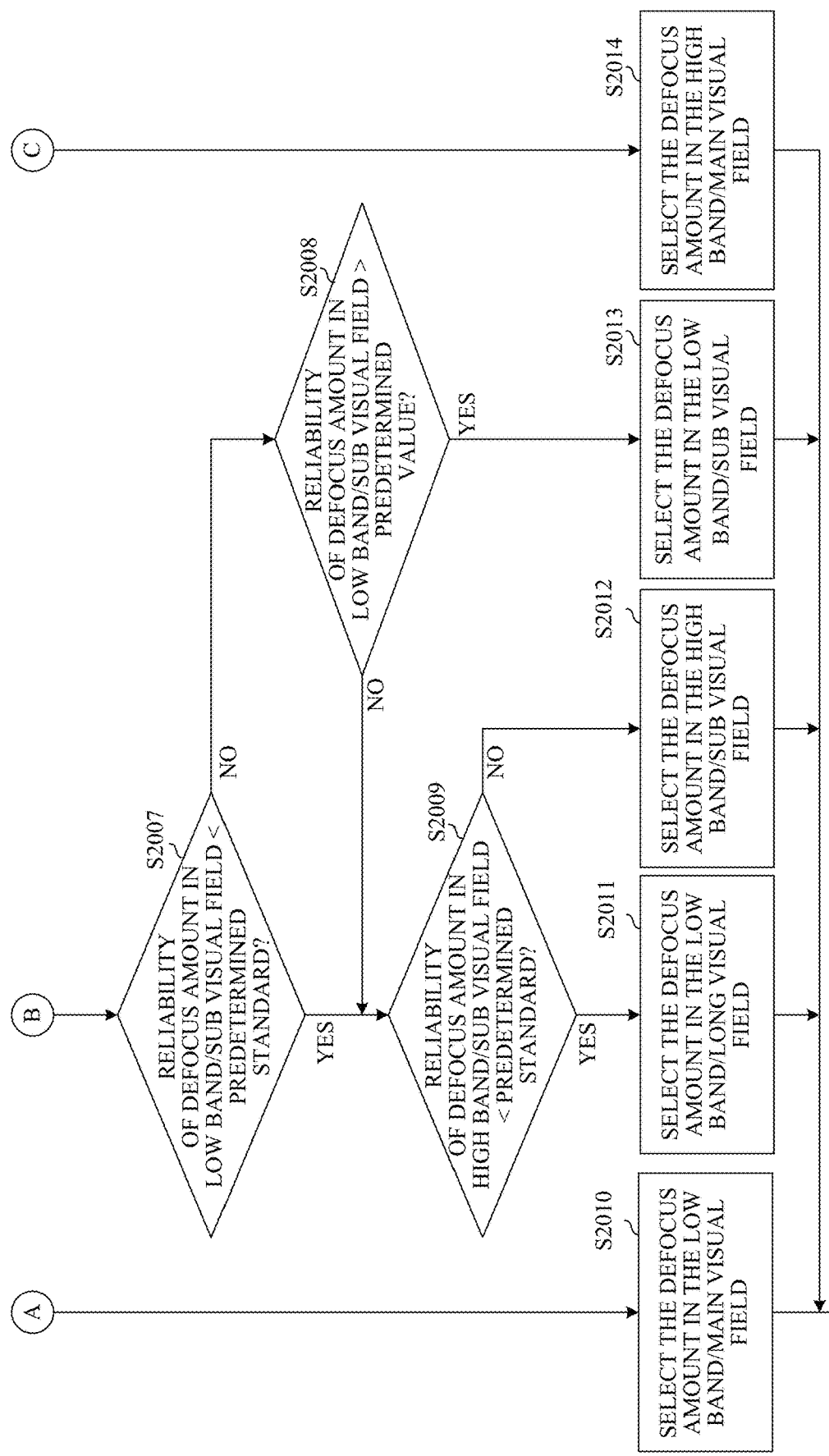

Referring now to FIGS. 20A and 20B, a description will be given of the use defocus amount selection processing performed by the use defocus amount selector 215 in the step S602 in FIG. 6.

In the step S2001, the use defocus amount selector 215 determines whether the size setting of the AF area is the narrow setting. When the setting is narrow, the flow proceeds to the step S2002, and when the setting is wide, the flow proceeds to the step S2003. In the step S2002, the use defocus amount selector 215 sets the main visual field to a short visual field and the sub visual field to a long visual field. In the step S2003, the use defocus amount selector 215 sets the main visual field to a long visual field and the sub visual field to a short visual field.

In the step S2004, the use defocus amount selector 215 determines whether the reliability of the defocus amount in the low band/main visual field is lower than a predetermined standard. When it is lower than the predetermined standard, the flow proceeds to the step S2006, and when it is higher than the predetermined standard, the flow proceeds to the step S2005.

In the step S2005, the use defocus amount selector 215 determines whether the absolute value of the defocus amount in the low band/main visual field is larger than a predetermined value. When it is larger than the predetermined value, the flow proceeds to the step S2010, and when it is smaller than the predetermined value, the flow proceeds to the step S2006. When the absolute value is equal to the predetermined value, the flow can go to either.

In the step S2006, the use defocus amount selector 215 determines whether the reliability of the defocus amount in the high band/main visual field is lower than a predetermined standard. When it is lower than the predetermined standard, the flow proceeds to the step S2007, and when it is higher than the predetermined standard, the flow proceeds to the step S2014.

In the step S2007, the use defocus amount selector 215 determines whether the reliability of the defocus amount in the low band/sub field is lower than the predetermined standard. When it is lower than the predetermined standard, the flow proceeds to the step S2009, and when it is higher than the predetermined standard, the flow proceeds to the step S2008.

In the step S2008, the use defocus amount selector 215 determines whether the absolute value of the defocus amount in the low band/sub field is larger than a predetermined value. When it is larger than the predetermined value, the flow proceeds to the step S2013, and when it is smaller than the predetermined value, the flow proceeds to the step S2009.

In the step S2009, the use defocus amount selector 215 determines whether the reliability of the defocus amount in the high band/sub field is lower than the predetermined standard. When it is lower than the predetermined standard, the flow proceeds to the step S2011, and when it is higher than the predetermined value, the flow proceeds to the step S2012. In the step S2010, the use defocus amount selector 215 selects the defocus amount in the low band/main visual field as the use defocus amount.

In the step S2011, the use defocus amount selector 215 selects the defocus amount in the low band/long visual field as the use defocus amount. The processing of this step is executed when all the defocus amounts are less reliable and no use defocus amount is available, and the main visual field and the sub visual field are not considered. This is because the search driving of the AF processing provides the AF control based on the defocus amount by monitoring the defocus amount in the low band/long visual field that is most likely to be calculated in a blurred state and by quickly detecting a reliable defocus amount.

In the step S2012, the use defocus amount selector 215 selects the defocus amount in the high band/sub field as the use defocus amount. In the step S2013, the use defocus amount selector 215 selects the defocus amount in the low band/sub field as the use defocus amount. In the step S2014, the use defocus amount selector 215 selects the defocus amount in the high band/main field as the use defocus amount.

In this embodiment, when the size setting (wide or narrow setting) of the AF area is enabled by operating the camera operator 208, the use defocus amount selection processing confirms the size setting of the AF area and provides processing such that the set size setting of the AF area is the main visual field. When the size setting of the AF area is set to the narrow setting, the main visual field is set to the short visual field, and when the size setting of the AF area is the wide setting, the main visual field is set to the long visual field. The visual field not set as the main visual field is set to the sub visual field.

The steps S2004 to S2010 and S2012 to S2014 in FIGS. 20A and 20B are processed similarly to the steps S1301 to S1310 in FIG. 16, respectively. The use defocus amount selection processing according to the first embodiment first determines whether the defocus amount in the long visual field is available, and then determines whether the defocus amount in the short visual field is available when the defocus amount in the long visual field is unavailable. On the other hand, this embodiment first determines whether the defocus amount in the main visual field is available and then determines whether the defocus amount in the sub visual field is available when the defocus amount in the main visual field is unavailable. Thus, the correlation calculation result having a size close to the visual field set by the user can be used and the object expected by the user can be focused by changing the visual field range to be preferentially used according to the size setting of the AF area.

As described above, this embodiment has the configuration capable of setting the size of the AF area, and changes the visual field range to be preferentially selected in selecting the use defocus amount in accordance with the size setting of the AF area. The defocus amount near the visual field set by the user is selectable by preferentially selecting a defocus amount in a short visual field when the size setting of the AF area is narrow and by preferentially selecting a defocus amount in a long visual field when the size setting of the AF area is wide. This configuration enables the object expected by the user to be easily focused. This embodiment has two types of size settings of the AF area, but may have three or more types. Even in this case, the defocus amount in the visual field range close to the size of the set AF area may be preferentially selected.

Fourth Embodiment

The third embodiment changes the priority of the visual field range in selecting the use defocus amount according to the size of the set AF area. In selecting the use defocus amount, this embodiment switches, based on the size of the set AF area, between preferentially selecting the visual field of the defocus amount and preferentially selecting a higher band. The imaging apparatus according to this embodiment has a configuration similar to that of the camera system 1 according to the first embodiment.

A description will now be given of the processing performed by the camera body 20 according to this embodiment. The imaging processing, the still image capturing processing, the focus state detection processing, the defocus saturation influence determination processing, the saturation row determination processing, the reliability conversion processing by the saturation influence, and the AF processing in this embodiment are the same as those described in the first embodiment, and a description thereof will be omitted.

Figure 21:
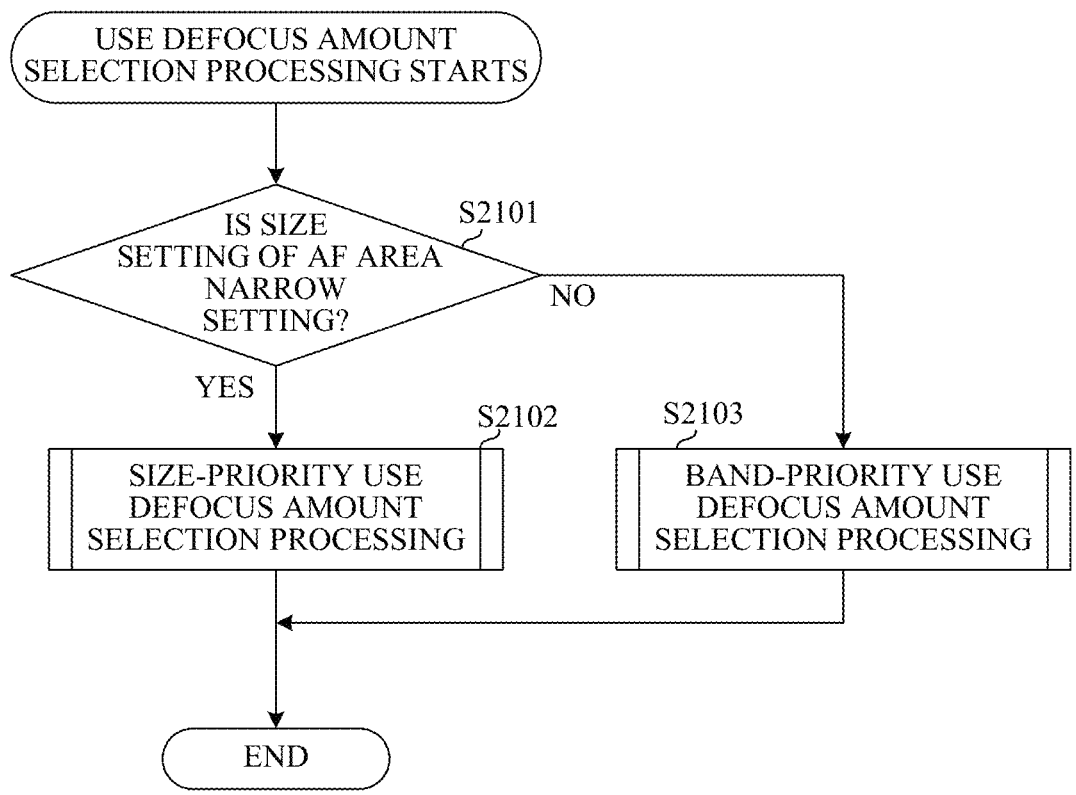
FIG. 21 is a flowchart illustrating use defocus amount selection processing according to the fourth embodiment.

Referring now to FIG. 21, a description will be given of the use defocus amount selection processing performed by the use defocus amount selector 215 in the step S602 in FIG. 6.

In the step S2101, the use defocus amount selector 215 determines whether the size setting of the AF area is the narrow setting. When the setting is narrow, the flow proceeds to the step S2102, and when the setting is wide, the flow proceeds to the step S2103. In the step S2102, the use defocus amount selector 215 performs size-priority use defocus amount selection processing. In the step S2103, the use defocus amount selector 215 performs band-priority use defocus amount selection processing.

Figure 22:
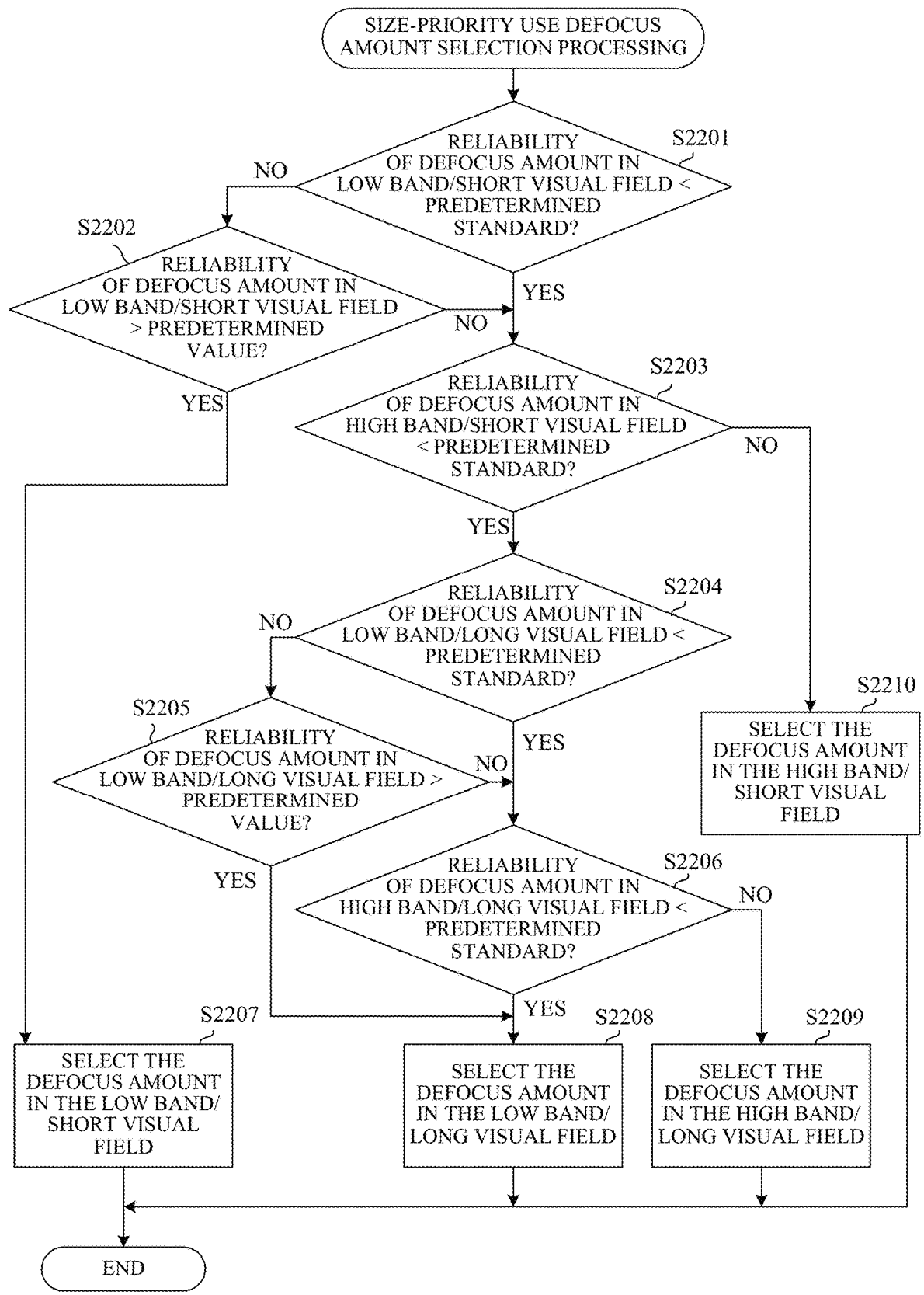
FIG. 22 is a flowchart illustrating size-priority use defocus amount selection processing according to the fourth embodiment.

Referring now to FIG. 22, a description will be given of the size-priority use defocus amount selection processing performed by the use defocus amount selector 215 in the step S2102 of FIG. 21. In the step S2201, the use defocus amount selector 215 determines whether the reliability of the defocus amount in the low band/short visual field is lower than a predetermined standard. When it is lower than the predetermined standard, the flow proceeds to the step S2203, and when it is higher than the predetermined standard, the flow proceeds to the step S2202.

In the step S2202, the use defocus amount selector 215 determines whether the absolute value of the defocus amount in the low band/short visual field is larger than a predetermined value. When it is larger than the predetermined value, the flow proceeds to the step S2207, and when it is smaller than the predetermined value, the flow proceeds to the step S2203. When the absolute value is equal to the predetermined value, the flow can go to either.

In the step S2203, the use defocus amount selector 215 determines whether the reliability of the defocus amount in the high band/short visual field is lower than a predetermined standard. When it is lower than the predetermined standard, the flow proceeds to the step S2204, and when it is higher than the predetermined standard, the flow proceeds to the step S2210.

In the step S2204, the use defocus amount selector 215 determines whether the reliability of the defocus amount in the low band/long visual field is lower than a predetermined standard. When it is lower than the predetermined standard, the flow proceeds to the step S2206, and when it is higher than the predetermined standard, the flow proceeds to the step S2205.

In the step S2205, the use defocus amount selector 215 determines whether the absolute value of the defocus amount in the low band/long visual field is larger than a predetermined value. When it is larger than the predetermined value, the flow proceeds to the step S2208, and when it is smaller than the predetermined value, the flow proceeds to the step S2206. When the absolute value is equal to the predetermined value, the flow can go to either.

In the step S2206, the use defocus amount selector 215 determines whether the reliability of the defocus amount in the high band/long visual field is lower than a predetermined standard. When it is lower than the predetermined standard, the flow proceeds to the step S2208, and when it is higher than the predetermined standard, the flow proceeds to the step S2209.

In the step S2207, the use defocus amount selector 215 selects the defocus amount in the low band/short visual field as the use defocus amount. In the step S2208, the use defocus amount selector 215 selects the defocus amount in the low band/long visual field as the use defocus amount. In the step S2209, the use defocus amount selector 215 selects the defocus amount in the high band/long visual field as the use defocus amount. In the step S2210, the use defocus amount selector 215 selects the defocus amount in the low band/short visual field as the use defocus amount.

This embodiment executes the size-priority use defocus amount selection processing when the size setting of the AF area is narrow. The size-priority use defocus amount selection processing preferentially selects the defocus amount in the visual field range close to the size of the set AF area. The size-priority use defocus amount selection processing first determines whether the defocus amount in the short visual field corresponding to the narrow size of the AF area is available, and then determines whether the defocus amount in the long visual field is available when the defocus amount in the short visual field is unavailable.

Figure 23:
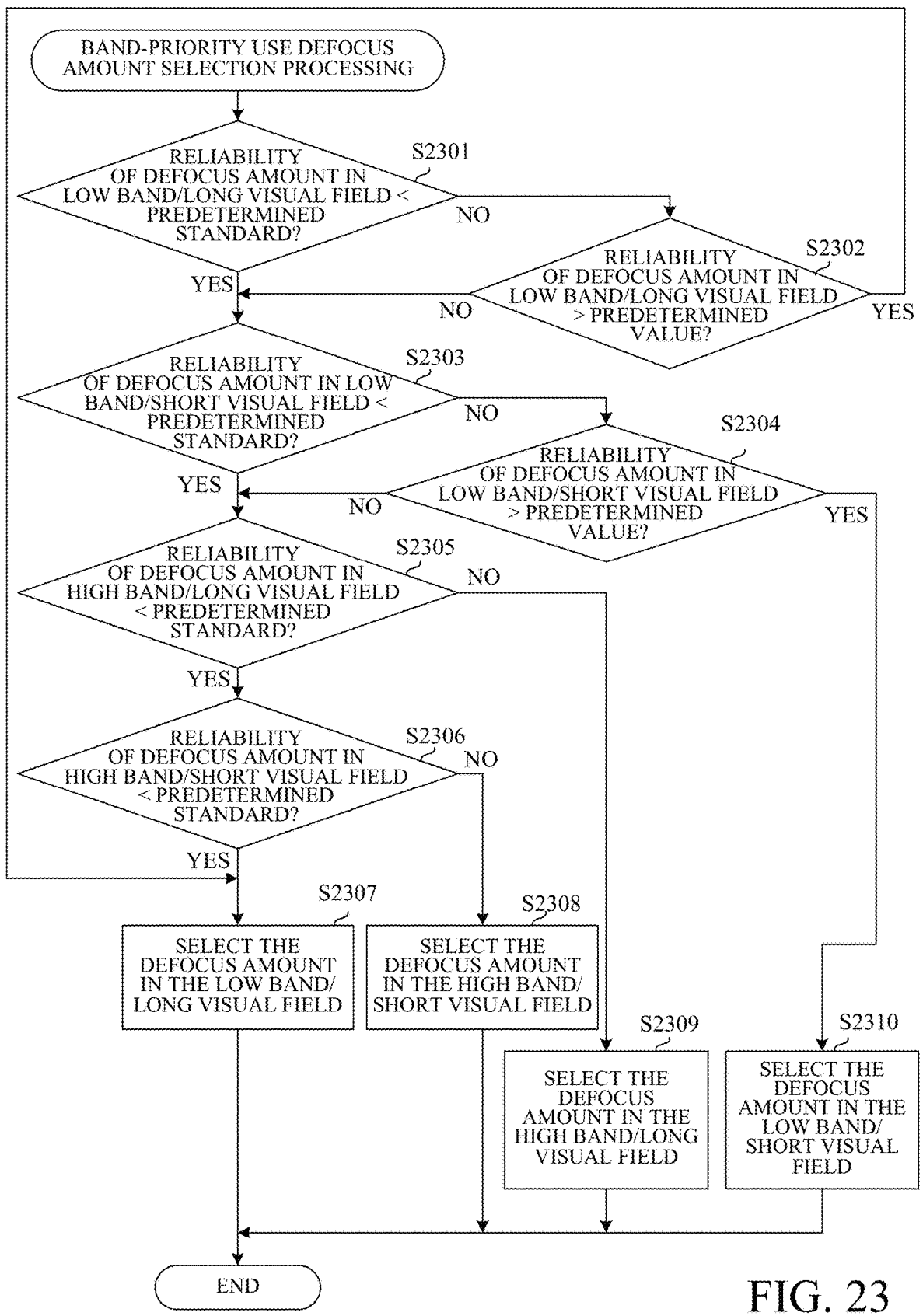
FIG. 23 is a flowchart illustrating band-priority use defocus amount selection processing according to the fourth embodiment.

Referring now to FIG. 23, a description will be given of the band-priority use defocus amount selection processing performed by the use defocus amount selector 215 in the step S2103 in FIG. 21.

In the step S2301, the use defocus amount selector 215 determines whether the reliability of the defocus amount in the low band/long visual field is lower than a predetermined standard. When it is lower than the predetermined standard, the flow proceeds to the step S2303, and when it is higher than the predetermined standard, the flow proceeds to the step S2302.

In the step S2302, the use defocus amount selector 215 determines whether the absolute value of the defocus amount in the low band/long visual field is larger than a predetermined value. When it is larger than the predetermined value, the flow proceeds to the step S2307, and when it is smaller than the predetermined value, the flow proceeds to the step S2303. When the absolute value is equal to the predetermined value, the flow can go to either.

In the step S2303, the use defocus amount selector 215 determines whether the reliability of the defocus amount in the low band/short visual field is lower than a predetermined standard. When it is lower than the predetermined standard, the flow proceeds to the step S2305, and when it is higher than the predetermined standard, the flow proceeds to the step S2304.

In the step S2304, the use defocus amount selector 215 determines whether the absolute value of the defocus amount in the low band/short visual field is larger than a predetermined value. When it is larger than the predetermined value, the flow proceeds to the step S2310, and when it is smaller than the predetermined value, the flow proceeds to the step S2305. When the absolute value is equal to the predetermined value, the flow can go to either.

In the step S2305, the use defocus amount selector 215 determines whether the reliability of the defocus amount in the high band/long visual field is lower than a predetermined standard. When it is lower than the predetermined standard, the flow proceeds to the step S2306, and when it is higher than the predetermined standard, the flow proceeds to the step S2309.

In the step S2305, the use defocus amount selector 215 determines whether the reliability of the defocus amount in the high band/short visual field is lower than the predetermined standard. When it is lower than the predetermined standard, the flow proceeds to the step S2307, and when it is higher than the predetermined standard, the flow proceeds to the step S2308. In the step S2307, the use defocus amount selector 215 selects the defocus amount in the low band/long visual field as the use defocus amount. In the step S2308, the use defocus amount selector 215 selects the defocus amount in the high band/short visual field as the use defocus amount. In the step S2309, the use defocus amount selector 215 selects the defocus amount in the high band/long visual field as the use defocus amount. In the step S2310, the use defocus amount selector 215 selects the defocus amount in the low band/short visual field as the use defocus amount.

This embodiment executes the band-priority use defocus amount selection processing when the size setting of the AF area is the wide setting. The band-priority use defocus amount selection processing preferentially selects the defocus amount in a specific band rather than the size of the set AF area. The bandwidth priority use defocus amount selection processing first determines whether the defocus amount in the low band is available, and then determines whether the defocus amount in the high band is available when the defocus amount in the low band is unavailable.

When the size setting of the AF area is the narrow setting, the long visual field if preferentially selected as the visual field of the use defocus amount may cause an object outside the AF area to be focused and an object expected by the user to be out of focus. Accordingly, the size-priority use defocus amount selection processing facilitates focusing on the object aimed at by the user by preferentially selecting the defocus amount in the short visual field. Where the AF is difficult, such as where the visual field has no contrast or is saturated, the defocus amount in the long visual field is selected because the defocus amount in the short visual field is unavailable.

On the other hand, when the size setting of the AF area is the wide setting, the AF area contains the short visual field and the object outside the AF area is unlikely to be focused even when the defocus amount in the short visual field is used instead of the defocus amount in the long visual field. Accordingly, the band-priority use defocus amount selection processing first preferentially selects the low band defocus amount and selects the defocus amount in the high band when the object approaches to the in-focus part, in order to quickly detect the defocus amount in the defocus case.

As described above, this embodiment has the configuration that can set the size of the AF area and switches between preferentially selecting the visual field range and preferentially selecting the band, in selecting the use defocus amount based on the size setting of the AF area. When the size setting of the AF area is the narrow setting, this embodiment applies a visual field range priority defocus amount selection algorithm, and when the size setting of the AF area is the wide setting, this embodiment applies a band-priority defocus amount selection algorithm. Thereby, if the visual field is likely to be entirely or partially located outside the AF area, the AF is performed in a visual field within the AF area, and if the visual field is likely to be within the AF area, this embodiment is more likely to detect the defocus amount when the object is blurred. This embodiment uses two types of size settings of the AF area, but may use three or more types. Even in this case, the visual field range priority and the band priority may be switched according to whether the visual field is partially or entirely located outside the AF area.

This embodiment has discussed the still image capturing processing, but the present invention is also applicable to the motion image capturing processing.

Other Embodiments

Embodiment(s) of the present invention can also be realized by a computer of a system or apparatus that reads out and executes computer executable commands (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable commands from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable commands. The computer executable commands may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-242226, filed on Dec. 18, 2017, which is hereby incorporated by reference herein in its entirety.

What is claimed is:

1. An imaging apparatus comprising:
an image sensor configured to output a pair of image signals based on a pair of light fluxes that have passed different exit pupil regions in an imaging optical system that includes a focus lens;
a calculator configured to calculate a plurality of focus evaluation values each having a different setting condition, based on the pair of image signals in a focus detection area in an image captured by the image sensor;
a detector configured to detect a plurality of saturation degrees for each of the plurality of focus evaluation values; and
a focusing unit configured to drive the focus lens by using focus evaluation values for focusing selected based on the plurality of saturation degrees out of the plurality of focus evaluation values, wherein the detector changes a parameter used to detect the plurality of saturation degrees based on the setting condition.

2. The imaging apparatus according to claim 1, wherein the setting condition includes at least one of a visual field range for calculating the focus evaluation value, a filter multiplied by the pair of image signals, and a pixel addition number of a horizontal pixel addition performed for the pair of image signals.

3. The imaging apparatus according to claim 1, wherein the parameter used to detect the plurality of saturation degrees includes at least one of a saturation determination range in a target row in the focus detection area, a saturated pixel number in the target row, and a number of target rows in which the saturated pixel number is greater than a predetermined value.

4. The imaging apparatus according to claim 1, wherein the detector changes the parameter used to detect the plurality of saturation degrees based on at least one of a diaphragm included in the imaging optical system, an exit pupil distance in the imaging optical system, and an image height in the focus detection area.

5. The imaging apparatus according to claim 1, wherein the focusing unit selects the focus evaluation value for focusing from the focus evaluation value having the saturation degree smaller than a predetermined value among the plurality of focus evaluation values.

6. The imaging apparatus according to claim 1, wherein the focusing unit preferentially selects as the focus evaluation value for focusing, the focus evaluation value where the setting condition includes a filter configured to pass a signal in the lowest band or the largest pixel addition number.

7. The imaging apparatus according to claim 1, further comprising a setter configured to set a size of the focus detection area,
wherein the focusing unit preferentially selects as the focus evaluation value for focusing, the focus evaluation value where the setting condition includes a visual field range used to calculate the focus evaluation value closest to the size of the focus detection area set by the setter.

8. The imaging apparatus according to claim 1, further comprising a setter configured to set a size of the focus detection area,
wherein the focusing unit changes a selection priority of the focus evaluation value for focusing based on the size set by the setter.

9. The imaging apparatus according to claim 8, wherein the focusing unit preferentially selects as the focus evaluation value for focusing, the focus evaluation value where the size set by the setter is smaller than a predetermined value and the setting condition includes the visual field range used to calculate the focus evaluation value closest to the size of the focus detection area set by the setter,
wherein the focusing unit preferentially selects as the focus evaluation value for focusing, the focus evaluation value where the size set by the setter is larger than the predetermined value and the setting condition includes a filter configured to pass a signal in the lowest band or the largest pixel addition number.

10. The imaging apparatus according to claim 1, wherein the focusing unit determines that focusing of the focus detection area is unavailable by using any one of the plurality of focus evaluation values, where each of the plurality of saturation degrees is larger than the predetermined value.

11. The imaging apparatus according to claim 1, wherein the focus evaluation value includes at least one of a correlation amount, a correlation change amount, an image shift amount, and a defocus amount.

12. A control apparatus comprising:
a calculation unit configured to calculate a plurality of focus evaluation values each having a different setting condition, based on a pair of image signals in a focus detection area in an image captured by an image sensor configured to output the pair of image signals based on a pair of light fluxes that have passed different exit pupil regions in an imaging optical system that includes a focus lens;
a detection unit configured to detect a plurality of saturation degrees for each of the plurality of focus evaluation values; and
a focusing unit configured to drive the focus lens by using focus evaluation values for focusing selected based on the plurality of saturation degrees out of the plurality of focus evaluation values,
wherein the detection unit changes a parameter used to detect the plurality of saturation degrees based on the setting condition,
wherein at least one processor or circuit is configured to perform a function of at least one of the units.

13. A computer-readable non-transitory storage medium for storing a computer program that enables a computer to execute a method comprising:
a calculating step of calculating a plurality of focus evaluation values each having a different setting condition, based on a pair of image signals in a focus detection area in an image captured by an image sensor configured to output the pair of image signals based on a pair of light fluxes that have passed different exit pupil regions in an imaging optical system that includes a focus lens;
a detecting step of detecting a plurality of saturation degrees for each of the plurality of focus evaluation values; and
a focusing step of driving the focus lens by using focus evaluation values for focusing selected based on the plurality of saturation degrees out of the plurality of focus evaluation values,
wherein the detecting step changes a parameter used to detect the plurality of saturation degrees based on the setting condition.

* * * * *